United States Patent
Jain et al.

(10) Patent No.: US 7,996,388 B2
(45) Date of Patent: Aug. 9, 2011

(54) ADDING NEW CONTINUOUS QUERIES TO A DATA STREAM MANAGEMENT SYSTEM OPERATING ON EXISTING QUERIES

(75) Inventors: Namit Jain, Santa Clara, CA (US); Anand Srinivasan, Karnatka, IN (US); Shailendra Kumar Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 351 days.

(21) Appl. No.: 11/874,202

(22) Filed: Oct. 17, 2007

(65) Prior Publication Data

US 2009/0106214 A1    Apr. 23, 2009

(51) Int. Cl.
*G06F 17/30* (2006.01)
(52) U.S. Cl. .................................... 707/718; 707/713
(58) Field of Classification Search ....... 707/4, E17.014, 707/713, 718
See application file for complete search history.

(56) References Cited

U.S. PATENT DOCUMENTS

| | | | | |
|---|---|---|---|---|
| 4,996,687 | A | * | 2/1991 | Hess et al. ............. 714/15 |
| 5,495,600 | A | | 2/1996 | Terry et al. |
| 5,822,750 | A | * | 10/1998 | Jou et al. .............. 707/2 |
| 5,826,077 | A | | 10/1998 | Blakeley et al. |
| 5,857,182 | A | | 1/1999 | DeMichiel et al. |
| 6,263,332 | B1 | | 7/2001 | Nasr et al. |
| 6,546,381 | B1 | | 4/2003 | Subramanian et al. |
| 6,836,778 | B2 | | 12/2004 | Manikutty et al. |
| 6,985,904 | B1 | | 1/2006 | Kaluskar et al. |
| 7,310,638 | B1 | * | 12/2007 | Blair ..................... 707/4 |
| 7,383,253 | B1 | | 6/2008 | Tsimelzon et al. |
| 7,403,959 | B2 | | 7/2008 | Nishizawa et al. |
| 7,673,065 | B2 | | 3/2010 | Srinivasan et al. |
| 2004/0064466 | A1 | | 4/2004 | Manikutty et al. |
| 2004/0220912 | A1 | | 11/2004 | Manikutty et al. |
| 2004/0220927 | A1 | | 11/2004 | Murthy et al. |
| 2004/0267760 | A1 | | 12/2004 | Brundage et al. |
| 2005/0055338 | A1 | | 3/2005 | Warner et al. |
| 2005/0065949 | A1 | | 3/2005 | Warner et al. |
| 2005/0229158 | A1 | | 10/2005 | Thusoo et al. |
| 2005/0289125 | A1 | | 12/2005 | Liu et al. |

(Continued)

OTHER PUBLICATIONS

Sharaf et al. "Efficient Scheduling of Heterogeneous Continous Queries", VLDB '06, Sep. 12-15, 2006, pp. 511-522.*

(Continued)

*Primary Examiner* — Mohammad Ali
*Assistant Examiner* — Thuy (Tiffany) Bui
(74) *Attorney, Agent, or Firm* — Silicon Valley Patent Group LLP; Omkar Suryadevara

(57) ABSTRACT

A new continuous query to a data stream management system (DSMS) may use a stream or a relation which may or may not be used by continuous queries previously registered in the DSMS. The DSMS is programmed to modify an execution plan to accommodate execution of the new query while continuing to execute the previously registered continuous queries. The modified execution plan may include new operators and/or share existing operators. The DSMS is programmed to cause operators which output a relation to propagate a current state of the relation to each newly-coupled operator that uses the relation. The current state is propagated only to operators that have been newly coupled and have thus not yet received any state information previously. After propagation of current state to newly-coupled operators, results of processing any new data for the relation are supplied to all operators coupled thereto, including newly-coupled operators and existing operators.

21 Claims, 9 Drawing Sheets

U.S. PATENT DOCUMENTS

| | | | |
|---|---|---|---|
| 2006/0031204 A1 | 2/2006 | Liu et al. |
| 2006/0100969 A1 | 5/2006 | Wang et al. |
| 2006/0230029 A1 | 10/2006 | Yan |
| 2006/0235840 A1 | 10/2006 | Manikutty et al. |
| 2007/0022092 A1 | 1/2007 | Nishizawa et al. |
| 2007/0136254 A1 | 6/2007 | Choi et al. |
| 2007/0294217 A1 | 12/2007 | Chen et al. |
| 2008/0028095 A1 | 1/2008 | Lang et al. |
| 2008/0046401 A1 | 2/2008 | Lee et al. |
| 2008/0114787 A1 | 5/2008 | Kashiyama et al. |
| 2008/0301124 A1 | 12/2008 | Alves et al. |
| 2009/0043729 A1 | 2/2009 | Liu et al. |
| 2009/0070786 A1 | 3/2009 | Alves et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106440 A1 | 4/2009 | Srinivasan et al. |
| 2009/0248749 A1 | 10/2009 | Gu et al. |

OTHER PUBLICATIONS

Sliding Window Query Processing over data streams by Lukasz Golab: University of Waterloo, Waterloo, Ont. Canada, Aug. 2006.*
Arasu, A. et al. "Stream: The Stanford Data Stream Management System", Department of Computer Science, Stanford University, 2004, pp. 21.
Chandrasekaran, S. et al. "TelegraphCQ: Continuous Dataflow Processing for an Uncertain World", Proceedings of CIDR 2003, pp. 12.
Chen, J. et al. "NiagaraCQ: A Scalable Continuous Query System for Internet Databases", Proceedings of 2000 ACM SIGMOD, pp. 12.
Terry, D.B. et al. "Continuous queries over append-only databases", Proceedings of 1992 ACM SIGMOD, pp. 321-330.
Arasu, A. et al. "The CQL Continuous Query Language: Semantic Foundation and Query Execution", VLDB Journal, vol. 15, Issue 2, Jun. 2006, pp. 32.
Arasu, A. et al. "An Abstract Semantics and Concrete Language for Continuous Queries over Streams and Relations", $9^{th}$ International Workshop on Database programming languages, Sep. 2003, pp. 12.
Babu, S. et al. "Continuous Queries over Data Streams", SIGMOD Record, Sep. 2001, pp. 12.
Munagala, K. et al. "Optimization of Continuous Queries with Shared Expensive Filters", Proceedings of the $26^{th}$ ACM SIGMOD-SIGACT-SIGART symposium on Principles of database systems, believed to be prior to Oct. 17, 2007, pp. 14.
Buza, A. "Extension of CQL over Dynamic Databases", Journal of Universal Computer Science, vol. 12, No. 9, 2006, pp. 12.
Avnur, R. et al. "Eddies: Continuously Adaptive Query Processing", In Proceedings of the 2000 ACM SIGMOD International Conference on Management of Data, Dallas, TX, May 2000, pp. 12.
Avnur, R. et al. "Eddies: Continuously Adaptive Query Processing", slide show, believed to be prior to Oct. 17, 2007, pp. 4.
Madden, S. et al. "Continuously Adaptive Continuous Queries (CACQ) over Streams", SIGMOD, 2002, pp. 6.
Deshpande, A. et al. "Adaptive Query Processing", believed to be prior to Oct. 17, 2007, pp. 27.
Widom, J. et al. "CQL: A Language for Continuous Queries over Streams and Relations", believed to be prior to Oct. 17, 2007, pp. 31.
Motwani, R. et al. "Models and Issues in Data Stream Systems", Proceedings of the $21^{st}$ ACM SIGMOD-SIGACT-SIGART symposium on Principles of database systems, 2002, pp. 26.
Widom, J. et al. "The Stanford Data Stream Management System", believed to be prior to Oct. 17, 2007, pp. 24.
Oracle Application Server 10 g Release 2 and 3, New Features Overview, An Oracle White Paper, Oct. 2005, pp. 48.
Oracle Database, SQL Language Reference, 11 g Release 1 (11.1), B28286-02, Sep. 2007, pp. 144.
Stream Query Repository: Online Auctions, http://www-db.stanford.edu/stream/sqr/onauc.html#queryspecsend , Dec. 2, 2002, pp. 2.
Stream Query Repository: Online Auctions (CQL Queries), http://www-db.stanford.edu/stream/sqr/cq1/onauc.html , Dec. 2, 2002, pp. 3.

Entire Prosecution History of U.S. Appl. No. 11/874,197, filed on Oct. 17, 2007 by Namit Jain et al.
Entire Prosecution History of U.S. Appl. No. 60/942,131, filed on Jun. 5, 2007 by Shailendra Mishra et al.
Entire Prosecution History of U.S. Appl. No. 11/874,850, filed on Oct. 18, 2007 by Namit Jain et al.
Entire Prosecution History of U.S. Appl. No. 11/874,896, filed on Oct. 18, 2007 by Anand Srinivasan et al.
Entire Prosecution History of U.S. Appl. No. 11/977,439, filed on Oct. 20, 2007 by Anand Srinivasan et al.
Entire Prosecution History of U.S. Appl. No. 11/977,437, filed on Oct. 20, 2007 by Anand Srinivasan et al.
Entire Prosecution History of U.S. Appl. No. 11/977,440, filed on Oct. 20, 2007 by Anand Srinivasan et al.
Entire Prosecution History of U.S. Appl. No. 11/874,197 filed on Oct. 17, 2007 by Namit Jain et al.
Entire Prosecution History of U.S. Appl. No. 11/873,407, filed on Oct. 16, 2007 by Namit Jain et al.
Preliminary Amendment dated Oct. 15, 2009 in U.S. Appl. No. 11/874,850.
Notice of Allowance dated Nov. 24, 2009 in U.S. Appl. No. 11/874,850.
Supplemental Notice of Allowance dated Dec. 11, 2009 in U.S. Appl. No. 11/874,850.
Supplemental Notice of Allowance dated Jan. 27, 2010 in U.S. Appl. No. 11/874,850.
Amendment after Notice of Allowance dated Feb. 24, 2010 in U.S. Appl. No. 11/874,850.
Preliminary Amendment dated Oct. 16, 2009 in U.S. Appl. No. 11/874,896.
Office Action dated Dec. 8, 2009 in U.S. Appl. No. 11/874,896.
Amendment dated Apr. 8, 2010 in U.S. Appl. No. 11/874,896.
Final Office Action dated Jul. 23, 2010 in U.S. Appl. No. 11/874,896.
Request for Continued Examination and Amendment dated Oct. 25, 2010 in U.S. Appl. No. 11/874,896.
Preliminary Amendment dated Oct. 15, 2009 in U.S. Appl. No. 11/977,439.
Office Action dated Apr. 13, 2010 in U.S. Appl. No. 11/977,439.
Amendment dated Jul. 13, 2010 in U.S. Appl. No. 11/977,439.
Notice of Allowance dated Aug. 18, 2010 in U.S. Appl. No. 11/977,439.
Office Action dated Oct. 13, 2009 in U.S. Appl. No. 11/977,437.
Amendment dated Jan. 13, 2010 in U.S. Appl. No. 11/977,437.
Final Office Action dated Apr. 8, 2010 in U.S. Appl. No. 11/977,437.
Request for Continued Examination and Amendment dated Sep. 8, 2010 in U.S. Appl. No. 11/977,437.
Notice of Allowance dated Oct. 7, 2009 in U.S. Appl. No. 11/977,440.
Amendment after Notice of Allowance dated Dec. 5, 2009 in U.S. Appl. No. 11/977,440.
Response to Amendment dated Jan. 7, 2010 in U.S. Appl. No. 11/977,440.
Preliminary Amendment dated Oct. 14, 2009 in U.S. Appl. No. 11/874,197.
Office Action dated Nov. 10, 2009 in U.S. Appl. No. 11/874,197.
Amendment dated Mar. 10, 2010 in U.S. Appl. No. 11/874,197.
Final Office Action dated Jun. 29, 2010 in U.S. Appl. No. 11/874,197.
Request for Continued Examination and Amendment dated Oct. 29, 2010 in U.S. Appl. No. 11/874,197.
Preliminary Amendment dated Oct. 16, 2010 in U.S. Appl. No. 11/873,407.
Office Action dated Nov. 13, 2009 in U.S. Appl. No. 11/873,407.
Amendment dated Feb. 16, 2010 in U.S. Appl. No. 11/873,407.
Final Office Action dated Apr. 26, 2010 in U.S. Appl. No. 11/873,407.
Request for Continued Examination dated Aug. 26, 2010 in U.S. Appl. No. 11/873,407.
Notice of Allowance dated Nov. 10, 2010 in U.S. Appl. No. 11/873,407.
Office Action dated Sep. 17, 2008 in U.S. Appl. No. 11/601,415.
Amendment dated Jan. 20, 2009 in U.S. Appl. No. 11/601,415.
Final Office Action dated May 27, 2009 in U.S. Appl. No. 11/601,415.
Amendment dated Jul. 27, 2009 in U.S. Appl. No. 11/601,415.

Request for Continued Examination and Amendment dated Aug. 27, 2009 in U.S. Appl. No. 11/601,415.
Office Action dated Nov. 30, 2009 in U.S. Appl. No. 11/601,415.
Amendment dated Mar. 29, 2010 in U.S. Appl. No. 11/601,415.
Final Office Action dated Jun. 30, 2010 in U.S. Appl. No. 11/601,415.
Request for Continued Examination and Amendment dated Nov. 1, 2010 in U.S. Appl. No. 11/601,415.
Diao, Y. "Query Processing for Large-Scale XML Message Brokering", 2005, University of California Berkeley, pp. 226.
Diao, Y. et al. "Query Processing for High-Volume XML Message Brokering", Proceedings of the 29$^{th}$ VLDB Conference, Berlin, Germany, 2003, pp. 12.
Jin, C. et al. "ARGUS: Efficient Scalable Continuous Query Optimization for Large-Volume Data Streams", 10$^{th}$ International Database Engineering and Applications Symposium (IDEAS'06), 2006, pp. 7.
Bose, S. et al., "A Query Algebra for Fragmented XML Stream Data", 9$^{th}$ International Workshop on Data Base Programming Languages (DBPL), Sep. 2003, Postdam, Germany, http://lambda.uta.edu/dbpl03.pdf, pp. 11.
Fernandez, Mary et al., "Build your own XQuery processor", http://edbtss04,dia.uniroma3.it/Simeon.pdf, pp. 116.
Fernandez, Mary et al., Implementing XQuery 1.0: The Galax Experience:, Proceedings of the 29$^{th}$ VLDB Conference, Berlin, Germany, 2003, pp. 4.
Florescu, Daniela et al., "The BEA/XQRL Streaming XQuery Processor", Proceedings of the 29$^{th}$ VLDB Conference, 2003, Berlin, Germany, pp. 12.
Gilani, A. Design and implementation of stream operators, query instantiator and stream buffer manager, Dec. 2003, pp. 138.
Interview Summary dated Nov. 16, 2010 in U.S. Appl. No. 11/874,197.
Office Action dated Nov. 22, 2010 in U.S. Appl. No. 11/874,896.
Notice of Allowance dated Nov. 24, 2010 in U.S. Appl. No. 11/977,439.
Examiner Interview Summary dated Nov. 18, 2009 in U.S. Appl. No. 11/874,850; 3 pages.
Office Action dated Nov. 22, 2010 in U.S. Appl. No. 11/874,896; 25 pages.
Examiner Interview Summary dated Oct. 25, 2010 in U.S. Appl. No. 11/874,896; 3 pages.
Terminal Disclaimer dated Jul. 13, 2010 filed in U.S. Appl. No. 11/977,439 over U.S. Appl. No. 11/874,896; 2 pages.
Terminal Disclaimer dated Jul. 13, 2010 filed in U.S. Appl. No. 11/977,439 over US Patent 7,673,065; 2 pages.
Terminal Disclaimer dated Jul. 13, 2010 filed in U.S. Appl. No. 11/977,439 over U.S. Appl. No. 11/977,437; 2 pages.
Notice of Allowance dated Nov. 24, 2010 in U.S. Appl. No. 11/977,439; 8 pages.
Examiner Interview Summary, dated Aug. 17, 2010 in U.S. Appl. No. 11/977,437; 3 pages.
Examiner Interview Summary dated Dec. 1, 2009 in U.S. Appl. No. 11/977,440; 3 pages.
Advisory Action dated Aug. 18, 2009 in U.S. Appl. No. 11/601,415; 3 pages.
Examiner Interview Summary dated Oct. 12, 2010 in U.S. Appl. No. 11/601,415; 3 pages.
Amendment dated Nov. 1, 2010 in U.S. Appl. No. 11/601,415; 12 pages.
Examiner Interview Summary dated Aug. 30, 2010 in U.S. Appl. No. 11/873,407; 3 pages.
Examiner Interview Summary dated Nov. 10, 2010 in U.S. Appl. No. 11/873,407; 2 pages.
Examiner Interview Summary dated Nov. 16, 2010 in U.S. Appl. No. 11/874,197; 4 pages.
Amendment dated Feb. 20, 2011 in U.S. Appl. No. 11/977,439, 9 pages.
Notice of Allowance dated Mar. 16, 2011 in U.S. Appl. No. 11/977,439, 10 pages.
Amendment dated Feb. 22, 2011 in U.S. Appl. No. 11/874,896, 19 pages.
Preliminary Amendment dated Oct. 16, 2009 in U.S. Appl. No. 11/873,407, 5 pages.
Notice of Allowance dated Mar. 7, 2011 in U.S. Appl. No. 11/873,407, 8 pages.
Second Preliminary Amendment dated Oct. 14, 2009 in U.S. Appl. No. 11/874,197, 3 pages.
Office Action dated Dec. 22, 2010 in U.S. Appl. No. 11/874,197, 22 pages.
Arasu A. "CQL: A Language for Continuous Queries over Streams and Relations", 2004, Lecture Notes in Computer Science, vol. 2921/2004, pp. 1-19.
Examiner's Interview Summary dated May 23, 2011 in U.S. Appl. No. 11/874,896, 12 pages.
Terminal Disclaimer dated May 23, 2011 in U.S. Appl. No. 11/874,896 over U.S. Appl. No. 11/874,202, 3 pages.
Terminal Disclaimer dated May 23, 2011 in U.S. Appl. No. 11/874,896 over U.S. Appl. No. 11/977,439, 3 pages.
Terminal Disclaimer dated May 23, 2011 in U.S. Appl. No. 11/874,896 over U.S. Appl. No. 11/977,437, 3 pages.
Terminal Disclaimer dated May 23, 2011 in U.S. Appl. No. 11/874,896 over U.S. Patent 7,673,065, 3 pages.
Terminal Disclaimer dated May 23, 2011 in U.S. Appl. No. 11/874,896 over U.S. Appl. No. 11/874,197, 3 pages.
Applicant's Interview Summary dated May 23, 2011 in U.S. Appl. No. 11/874,896, 2 pages.
Terminal Disclaimer Review Decision dated Jun. 2, 2011 in U.S. Appl. No. 11/874,896, 2 pages.
Notice of Allowance dated Jun. 23, 2011 in U.S. Appl. No. 11/874,896, 33 pages.
Amendment dated May 23, 2011 in U.S. Appl. No. 11/874,197, 15 pages.

* cited by examiner

```
Q1: Select B, max(A)
    From   S1 [Rows 50,000]
    Group By B
```

```
Q2: Select Istream(*)
    From   S1 [Rows 40,000], S2 [Range 600 Seconds]
    Where  S1.A = S2.A
```

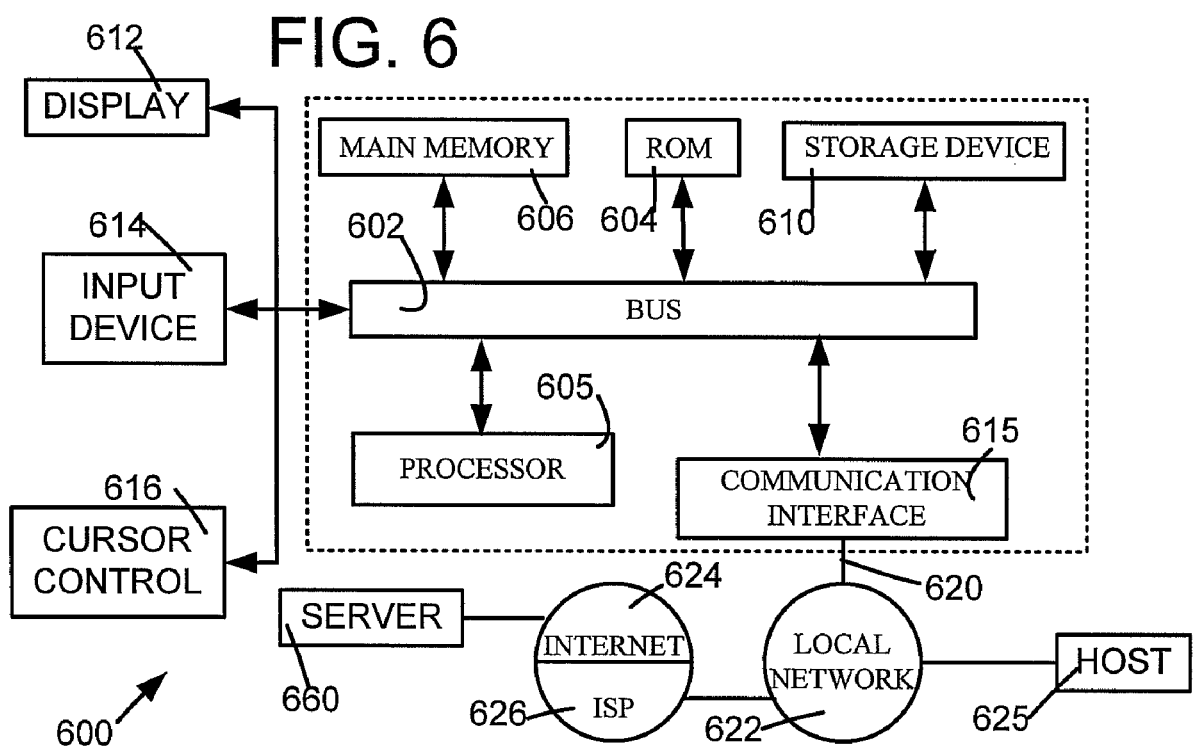

ADDING NEW CONTINUOUS QUERIES TO A DATA STREAM MANAGEMENT SYSTEM OPERATING ON EXISTING QUERIES

CROSS-REFERENCE TO RELATED APPLICATIONS

This application is related to and incorporates by reference herein in its entirety, a commonly-owned and concurrently-filed U.S. application Ser. No. 11/874,197, entitled "DYNAMICALLY SHARING A SUBTREE OF OPERATORS IN A DATA STREAM MANAGEMENT SYSTEM OPERATING ON EXISTING QUERIES" by Namit Jain et al.

BACKGROUND

It is well known in the art to process queries over continuous streams of data using one or more computer(s) that may be called a data stream management system (DSMS). Such a system may also be called an event processing system (EPS) or a continuous query (CQ) system, although in the following description of the current patent application, the term "data stream management system" or its abbreviation "DSMS" is used. DSMS systems typically receive from a user a textual representation of a query (called "continuous query") that is to be applied to a stream of data. Data in the stream changes over time, in contrast to static data that is typically found stored in a database. Examples of data streams are: real time stock quotes, real time traffic monitoring on highways, and real time packet monitoring on a computer network such as the Internet.

FIG. 1A illustrates a prior art DSMS built at the Stanford University, in which data streams from network monitoring can be processed, to detect intrusions and generate online performance metrics, in response to queries (called "continuous queries") on the data streams. Note that in such data stream management systems (DSMS), each stream can be infinitely long and the data can keep arriving indefinitely and hence the amount of data is too large to be persisted by a database management system (DBMS) into a database.

As shown in FIG. 1B a prior art DSMS may include a continuous query compiler that receives a continuous query and builds a physical plan which consists of a tree of natively supported operators. Any number of such physical plans (one plan per query) may be combined together, before DSMS starts normal operation, into a global plan that is to be executed. When the DSMS starts execution, the global plan is used by a query execution engine (also called "runtime engine") to identify data from one or more incoming stream(s) that matches a query and based on such identified data the engine generates output data, in a streaming fashion.

As noted above, one such system was built at Stanford University, in a project called the Standford Stream Data Management (STREAM) Project which is described in an article entitled "STREAM: The Stanford Data Stream Management System" by Arvind Arasu, Brian Babcock, Shivnath Babu, John Cieslewicz, Mayur Datar, Keith Ito, Rajeev Motwani, Utkarsh Srivastava, and Jennifer Widom published on the Internet in 2004. The just-described article is incorporated by reference herein in its entirety as background.

For more information on other such systems, see the following articles each of which is incorporated by reference herein in its entirety as background:

[a] S. Chandrasekaran, O. Cooper, A. Deshpande, M. J. Franklin, J. M. Hellerstein, W. Hong, S. Krishnamurthy, S. Madden, V. Ramna, F. Reiss, M. Shah, "TelegraphCQ: Continuous Dataflow Processing for an Uncertain World", Proceedings of CIDR 2003;

[b] J. Chen, D. Dewitt, F. Tian, Y. Wang, "NiagaraCQ: A Scalable Continuous Query System for Internet Databases", PROCEEDINGS OF 2000 ACM SIGMOD, p 379-390; and

[c] D. B. Terry, D. Goldberg, D. Nichols, B. Oki, "Continuous queries over append-only databases", PROCEEDINGS OF 1992 ACM SIGMOD, pages 321-330.

Continuous queries (also called "persistent" queries) are typically registered in a data stream management system (DSMS) prior to its operation on data streams. The continuous queries are typically expressed in a declarative language that can be parsed by the DSMS. One such language called "continuous query language" or CQL has been developed at Stanford University primarily based on the database query language SQL, by adding support for real-time features, e.g. adding data stream S as a new data type based on a series of (possibly infinite) time-stamped tuples. Each tuple s belongs to a common schema for entire data stream S and the time t is a monotonically non-decreasing sequence. Note that such a data stream can contain 0, 1 or more pairs each having the same (i.e. common) time stamp.

Stanford's CQL supports windows on streams (derived from SQL-99) based on another new data type called "relation", defined as follows. A relation R is an unordered group of tuples at any time instant t which is denoted as R(t). The CQL relation differs from a relation of a standard relational database accessed using SQL, because traditional SQL's relation is simply a set (or bag) of tuples with no notion of time, whereas the CQL relation (or simply "relation") is a time-varying group of tuples (e.g. the current number of vehicles in a given stretch of a particular highway). All stream-to-relation operators in Stanford's CQL are based on the concept of a sliding window over a stream: a window that at any point of time contains a historical snapshot of a finite portion of the stream. Syntactically, sliding window operators are specified in CQL using a window specification language, based on SQL-99.

For more information on Stanford University's CQL, see a paper by A. Arasu, S. Babu, and J. Widom entitled "The CQL Continuous Query Language: Semantic Foundation and Query Execution", published as Technical Report 2003-67 by Stanford University, 2003 (also published in VLDB Journal, Volume 15, Issue 2, June 2006, at Pages 121-142). See also, another paper by A. Arasu, S. Babu, J. Widom, entitled "An Abstract Semantics and Concrete Language for Continuous Queries over Streams and Relations" in 9th Intl Workshop on Database programming languages, pages 1-11, September 2003. The two papers described in this paragraph are incorporated by reference herein in their entirety as background.

An example to illustrate continuous queries is shown in FIGS. 1C-1E. Specifically, FIG. 1E illustrates a merged STREAM query plan for two continuous queries, Q1 and Q2 over input streams S1 and S2. Query Q1 of FIG. 1E is shown in detail in FIG. 1C expressed in CQL as a windowed-aggregate query: it maintains the maximum value of S1:A for each distinct value of S1:B over a 50,000-tuple sliding window on stream S1. Query Q2 shown in FIG. 1D is expressed in CQL and used to stream the result of a sliding-window join over streams S1 and S2. The window on S1 is a tuple-based window containing the last 40,000 tuples, while the window on S2 is a 10-minutes time-based window.

Several DSMS of prior art, such as Stanford University's DSMS treat queries as fixed entities and treat event data as an unbounded collection of data elements. This approach has delivered results as they are computed in near real time. However, in most continuous query systems this prior art approach does not allow continuous queries to be added dynamically. One reason is that a query plan is computed at the time of registration of all queries, before such a prior art DSMS even begins operations on streams of event data.

Once queries have registered and such a prior art DSMS begins to process event data, the query plan cannot be changed, in prior art systems known to the current inventors. The current inventors recognize that adding queries can be done, for example by quiescing Stanford University's DSMS, adding the required queries and starting up the system again. However, the current inventors note that it gives rise to indeterminate scenarios e.g. if a DSMS is being quiesced, there is no defined checkpoint for data in a window for incomplete calls or for data of intermediate computation that has already been performed at the time the DSMS is quiesced.

In one prior art DSMS, even after it begins normal operation by executing a continuous query Q1, it is possible for a human (e.g. network operator) to register an "ad-hoc continuous query" Q2, for example to check on congestion in a network. Such a query Q2 may be written to find a fraction of traffic on a backbone link that is coming from a customer network. In highly-dynamic environments, a data stream management system (DSMS) is likely to see a constantly changing collection of queries and needs to react quickly to query changes without adversely affecting the processing of incoming time-stamped tuples (e.g. streams).

SUMMARY

A computer is programmed in accordance with the invention to implement a data stream management system (DSMS) that receives a new continuous query (also called simply "new query") during execution of one or more continuous queries that have been previously registered (also called "existing queries"). The new query is to be executed by the DSMS on a stream or a relation, which may or may not be executed upon by existing queries. The new query is received (e.g. from a user) during normal operation of the DSMS in an ad-hoc manner, in the midst of processing incoming streams of data by executing a number of existing queries based on a global plan.

Specifically, a computer is programmed in several embodiments of the invention to automatically modify the global plan on the fly, to accommodate both execution of the new query and also continuing execution of existing queries. A modified plan which results therefrom may include new operators and/or sharing of one or more operators that are currently being used in execution of existing queries. Accordingly, a computer in several embodiments of the invention compiles a new query, if possible by sharing one or more operators between the new query and one or more existing queries.

In such embodiments, when compilation of the new query is complete, any operators that were not previously scheduled for execution (i.e. newly coupled operators) are also scheduled for execution, thereby to alter the above-described processing to henceforth be based on the modified plan. In some embodiments, any operators that were previously scheduled continue to execute as per schedule, independent of addition of the new query. Depending on the embodiment, execution of existing queries is performed without any interruption, or with minimal interruption from coupling and scheduling of execution of new operators required to execute the new query.

Unlike Stanford University's DSMS described in the Background section above, a new query that is added in accordance with the invention is not pre-defined. Furthermore, unlike Stanford University's DSMS, a new query is received and executed without a DSMS of several embodiments of the invention being quiesced, i.e. while continuing to receive input streams and transmit output streams. Moreover, in many embodiments, the existing operators may transmit the current value of a relation to the newly added operator (for the new query) via the newly created queues. The new query of several embodiments shares execution structures as much as possible with the existing global plan, and a newly added operator's structure(s) are populated based on existing inputs.

Moreover, unlike the prior DSMSs of the type described in the Background section above, a DSMS in accordance with the invention supports addition of queries over relations in addition to streams. In several embodiments, there is no restriction on the type of the query being added. In some embodiments, the mechanism is also independent of the internal representation of the relation in the server although in certain embodiments an incremental representation of the relation is used. In embodiments where the absolute representation of the relation is used, the propagation mechanism as described herein continues to work without any changes.

None of the prior art known to the inventors of the current patent application discloses or suggests propagation of a current state of a relation to one or more operators which are to be used by a new query. Specifically, during operation of a DSMS in accordance with the invention, when an operator on a relation (called "relation operator") is awakened, the relation operator first propagates a current state of the relation to any operator(s) that have been newly coupled thereto, for use in execution of the new query.

In some embodiments, the current state is propagated only to those operators that are newly coupled to an existing relation operator. The propagation is performed so that these newly coupled operators receive the current state information. The current state is not propagated to any operators that were already in existence (also called "existing operators"). After propagation of the current state, any new information received by the relation operator is processed and results therefrom are supplied to all operators coupled to the relation operator, including newly-coupled operators and any existing operators. In this manner, these embodiments continue to process input data streams, now using the modified plan.

BRIEF DESCRIPTION OF THE DRAWINGS

FIG. 6 illustrates, in a high level block diagram, hardware included in a computer that may be used to perform the methods of FIGS. 5A-5C in some embodiments of the invention.

DETAILED DESCRIPTION

Figure 1A:
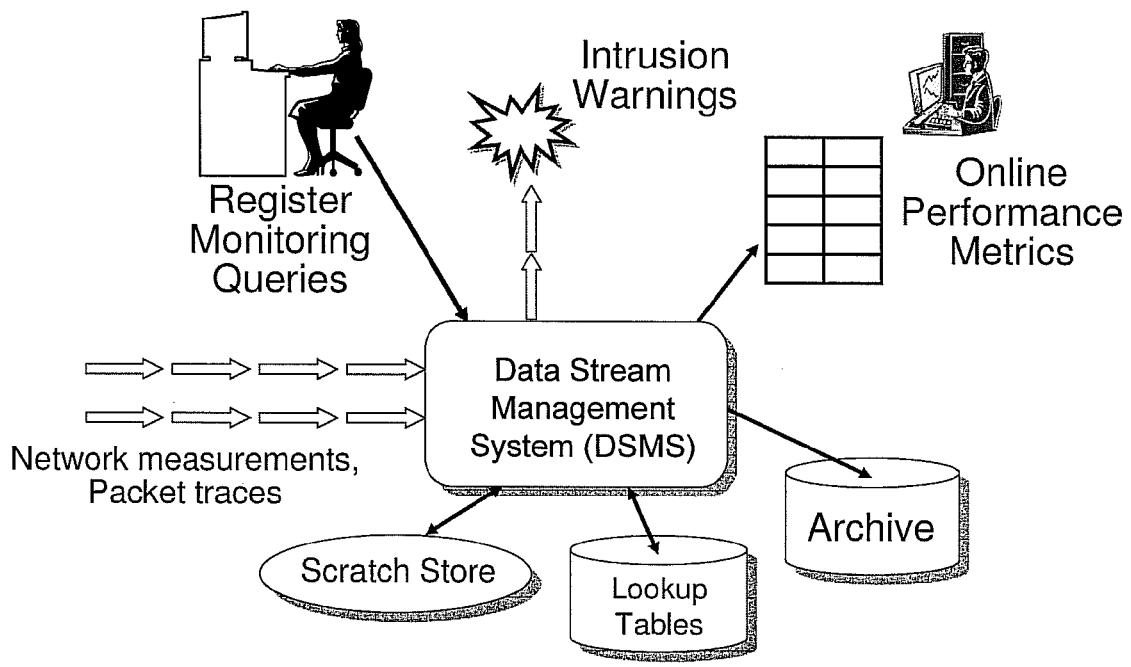
FIGS. 1A and 1B illustrate, in a high level diagram and an intermediate level diagram respectively, a data stream management system of the prior art.
Figure 1B:
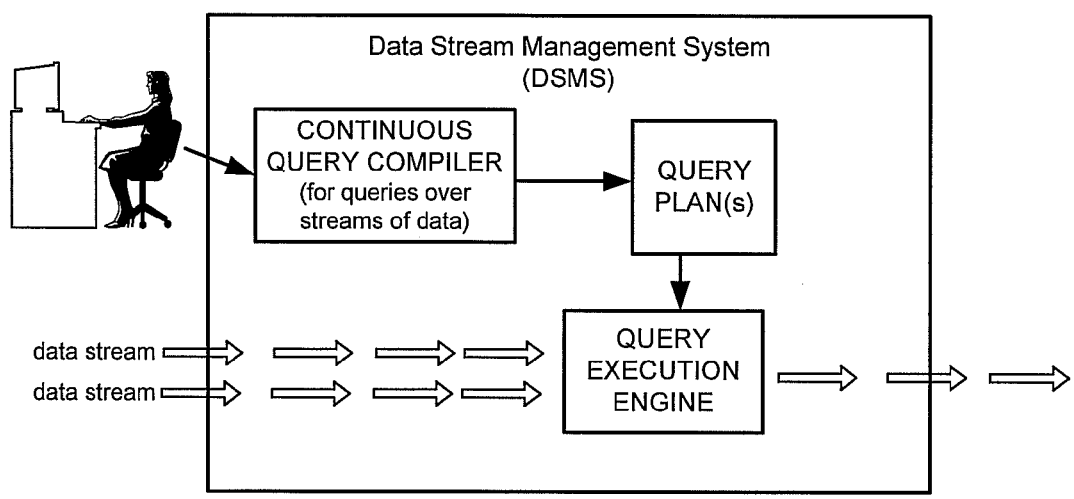
Figures 1C, 1D, 1E:
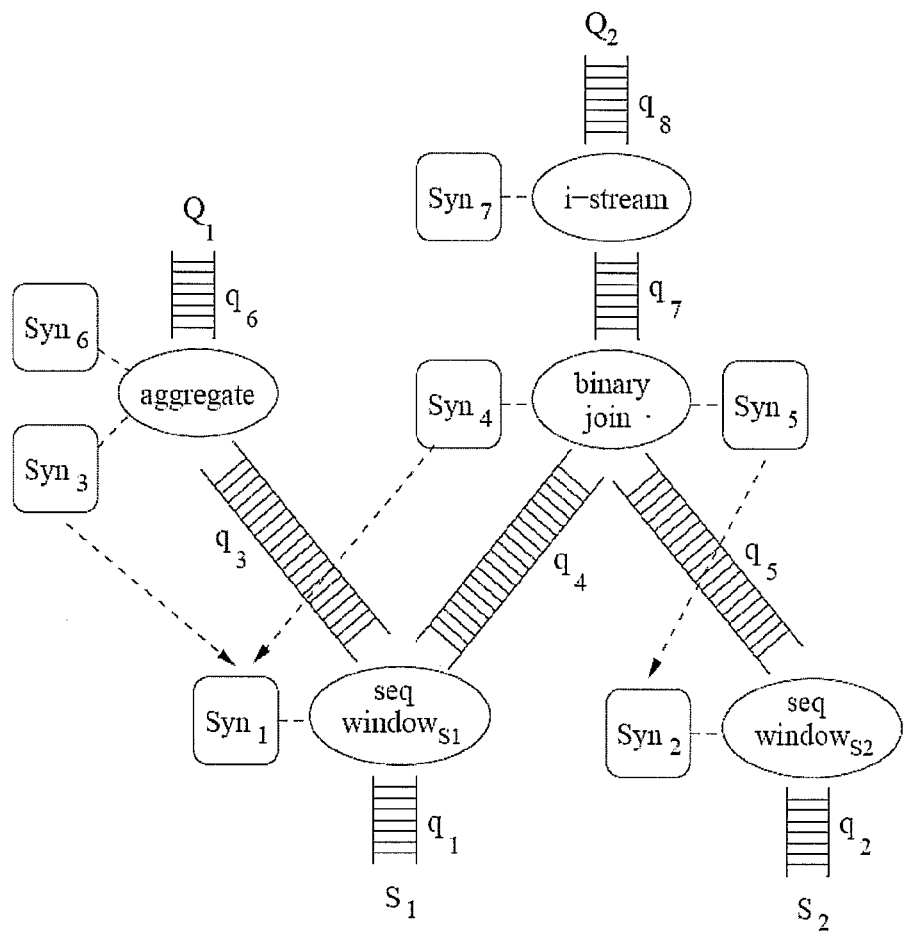
FIGS. 1C and 1D illustrate two queries expressed in a continuous query language (CQL) of the prior art.
FIG. 1E illustrates a query plan of the prior art for the two continuous queries of FIGS. 1C and 1D.

Many embodiments of the invention use a DSMS whose continuous query language (CQL) natively supports certain standard SQL keywords, such as a SELECT command having a FROM clause and in addition also supports windowing functions required for stream and/or relation operations. Note that even though several keywords and/or syntax may be used identically in both SQL and CQL, the semantics are different for these two languages because SQL may be used to define queries on stored data in a database whereas CQL is used to define queries on transient data in a data stream.

A DSMS which includes a computer programmed as described in published literature about the Standford Stream Data Management (STREAM) Project is extended by programming it with certain software in several embodiments of the invention called a continuous query compiler, as discussed below. A continuous query compiler is implemented in accordance with the invention to receive and act on a new continuous query q in an ad-hoc manner, e.g. on the fly during normal operation of the DSMS on existing queries. Accordingly, such a DSMS in accordance with the invention is hereinafter referred to as an extended DSMS.

After receipt, new continuous query q is automatically compiled by continuous query compiler 210 (FIG. 2) performing several acts that are normally performed to implement query compilation, and after compilation the new continuous query q is automatically executed. Query receipt, compilation and execution are performed by some embodiments of extended DSMS 200 (FIG. 2) while processing incoming streams of data 250 by executing thereon one or more continuous queries that were already being executed ("existing queries") prior to receipt of the new continuous query q.

For example, simultaneous with generation of output data stream 231 by execution of existing queries, continuous query compiler 210 parses new continuous query q to build an abstract syntax tree (AST), followed by building a tree of operators. Such a tree of operators typically includes, one or more operators (also called "source operators") that act as source(s) of tuples based on incoming data stream(s) 250 (FIG. 2), and/or source(s) of a stream of information on a relation received via link 243.

In addition to source operators (which are typically but not necessarily located at leaf nodes), the tree of operators includes one or more operators at intermediate nodes (called "query processing operators") that receive data streams from the source operators, and a single root node which includes an output operator to output the results of processing the query. The tree of operators is typically included in a logical plan which does not reference any physical structures. In creating the logical plan, any semantic errors are flagged (e.g. any type mismatches and/or references to non-existent sources of data streams). The nodes of a tree in the logical plan are typically logical operators that are supported by the continuous query language (CQL), such as SELECT and JOIN.

Several embodiments then create for that same new query q various physical operators and related resources, such as memory for a queue, needed to execute the query. Physical operators accept data of streams and/or relations as input and generate as output data of streams and/or relations. In this process, if the new continuous query q uses an operator already existing in a global plan located in memory 290 that is currently being executed (also called "executing plan") by query execution engine 230 on incoming stream(s) 250, then continuous query compiler 210 does not create a new physical operator. Instead, continuous query compiler 210 just modifies the executing plan in memory 290.

An executing plan which is currently being used by DSMS 200 contains physical resources of all operators for all queries currently being executed. When a new query is received for execution in act 301, then as per act 308 in FIG. 3, to support execution of the new query, continuous query compiler 210 updates the global plan, e.g. by reusing existing components (such as operators, stores and queues) and creates new components as necessary. For example, compiler 210 creates one or more new outputs for one or more operators existing in a global plan that is currently being executed by DSMS 200, and also creates one or more new operators (e.g. to generate an output stream to be included in stream 231) for the new query.

Then, as per act 309, continuous query compiler 210 alters the processing of incoming data streams 250 by query execution engine 230. After being altered, query execution engine 230 continues its processing of incoming data streams 250 by executing thereon not only the existing queries but also the new query. In some embodiments, a scheduler is invoked to allocate time slot(s) for any new operator(s) of the new query that are referenced in the modified plan that results from modification in act 308. Execution of the modified plan eventually results in execution of the new continuous query at an appropriate time (depending on when its operators are scheduled for execution), in addition to execution of existing queries. Some embodiments of the invention use a lock (e.g. a reentrant read write lock), to serialize updating of an operator by compiler 210 and its execution.

In some embodiments, any output(s) that is/are newly added to a relation operator is/are identified in the modified plan as such (e.g. flagged as requiring initialization), to support propagation thereto of the relation's current state, either before or at least when the relation operator is next awakened. After state propagation, the relation operator continues may process an incoming stream of data about a relation. Specifically, the processing continues wherever the relation operator had left off, when a prior time slot ended. As noted above, a scheduler allocates time slots in which the relation operator executes. On being awakened, the relation operator of some embodiments first propagates any new information on the relation that is received by the relation operator. Results of processing the new information is/are thereafter made available for reading at all outputs of the relation operator (including the newly added output).

Act 301 and portions of 308 (e.g. query parsing and logical tree construction) may be performed by continuous query compiler 210 of extended DSMS 200 in a manner similar or identical to a normal DSMS, unless described otherwise herein. Extended DSMS 200 of some embodiments accounts for the fact that new continuous queries can be added at any time during operation of extended DSMS 200 (e.g. while executing previously registered continuous queries), by any operator A checking (e.g. on being awakened in act 310) if the output of the operator A is a stream (as per act 311 in FIG. 3). If not a stream, the operator A further checks whether any new outputs resulting from compiling the new query Q1 (received in act 301) have been added for each relation (as per act 312 in FIG. 3) and if so propagating that relation's current state (obtained via line 244 in FIG. 2) to the new outputs (as per act 313 in FIG. 3). In the embodiment illustrated in FIG. 3, if the result in act 311 is yes (i.e. the operator's output is a stream), then control transfers directly to act 314. Note that other embodiments of DSMS 200 may implement the propagation of a relation's state prior to altering the processing by engine 230, i.e. independent of each operator's awakening and execution.

Also, awakening of operators in an executing plan and propagation of a relation's state can be performed in any order relative to one another depending on the embodiment. For example, although act 310 (to awaken an operator) is shown as being performed before act 313 in FIG. 3, other embodiments perform act 313 before performing act 310. Operator awakening in some embodiments is performed by a scheduler in query execution engine 230 that is programmed to automatically determine (e.g. in a round robin fashion) an order of execution of each operator relative to other operators. The scheduler's list of operators is updated with any new operators that may be required for new queries during registration. Depending on the embodiment, the scheduler may either preallocate time slots to all operators, or alternatively allocate time slots to each operator individually in a dynamic just-in-time manner.

Accordingly, during registration of each new continuous query, the scheduler allocates a time slice for execution of each new operator therein. In several embodiments, the scheduler operates without interrupting one or more operators that are being executed in a current time slice. Hence, in some embodiments, the processing of existing queries is altered to permit processing of the new query thereby to effect a switchover from a currently executing plan to a modified executing plan. In an illustrative embodiment, altering of normal processing is performed at the end of a current time slice, with no delay (i.e. not noticeable in output stream 231 in FIG. 2) in execution of existing queries.

Accordingly, after registration of a new continuous query as described above, the extended DSMS continues to perform processing of input data streams 250 in the normal manner but now using the new query in addition to existing queries, i.e. based on the modified plan. Hence, output data streams 231 that were being generated by execution of existing queries continue to be generated without interruption, but are supplemented after the altering of processing, by one or more data streams from an output operator of the new continuous query, i.e. by execution of the new continuous query.

Depending on the embodiment, an unmodified plan (i.e. a global plan prior to modification) may be originally created, prior to receipt of the new continuous query, by merging of several physical plans for corresponding queries that are currently being executed. The specific methods being used in merging can be different, depending on the embodiment. In some embodiments, a new physical plan is merged into an unmodified plan by sharing just event source operators therebetween, as discussed below in reference to FIGS. 5A-5C. Several other embodiments perform on-the-fly merging of a physical plan for a new query, with a plan that is currently being executed for existing queries, by sharing not only source operators but also operators at intermediate nodes of an operator tree for the new query, as described in for example, U.S. patent application Ser. No. 11/874,197 which is incorporated by reference, as noted at the beginning of the current patent application.

Information about a relation that is supplied by link 244 is typically held in a store 280 in extended DSMS 200. Store 280 is typically multi-ported in order to enable multiple readers to access information stored therein. Store 280 may be used to store a relation R's information such as a current state R(t). In certain embodiments relation R is represented in an incremental manner, by tuples that are time stamped, and represent requests for incremental changes to the relation's initial state R(0). An example of a relation that may be represented in this manner is the number of chairs in a conference room. However, other embodiments do not use tuples, and instead maintain in memory an image of the relation's current state R(t), and this image is changed dynamically as relation R changes over time. An example of a relation that may be represented by an image is a Range Window operator on a stream, e.g. if window depth is 10, then such an image holds just 10 tuples.

In a conference room example for a relation operator described above, current state is propagated based on the relation's incremental representation. Specifically, in this example, the number of chairs in a given conference room is one integer, which changes whenever a new chair gets added or removed from the conference room. Instead of propagating all the number of chairs from the beginning of time, which might be a very large stream, we will only propagate the current value of the number of chairs (which is just 1 integer or 1 long depending on the storage type used for the number of chairs). So, at the point at which a new query is added, one illustrative DSMS embodiment simply propagates the value of the relation at that point in time, which depends on the changes from the beginning in time, but may not contain all the changes (because an item which got added and then removed subsequently does not count).

Figure 2:
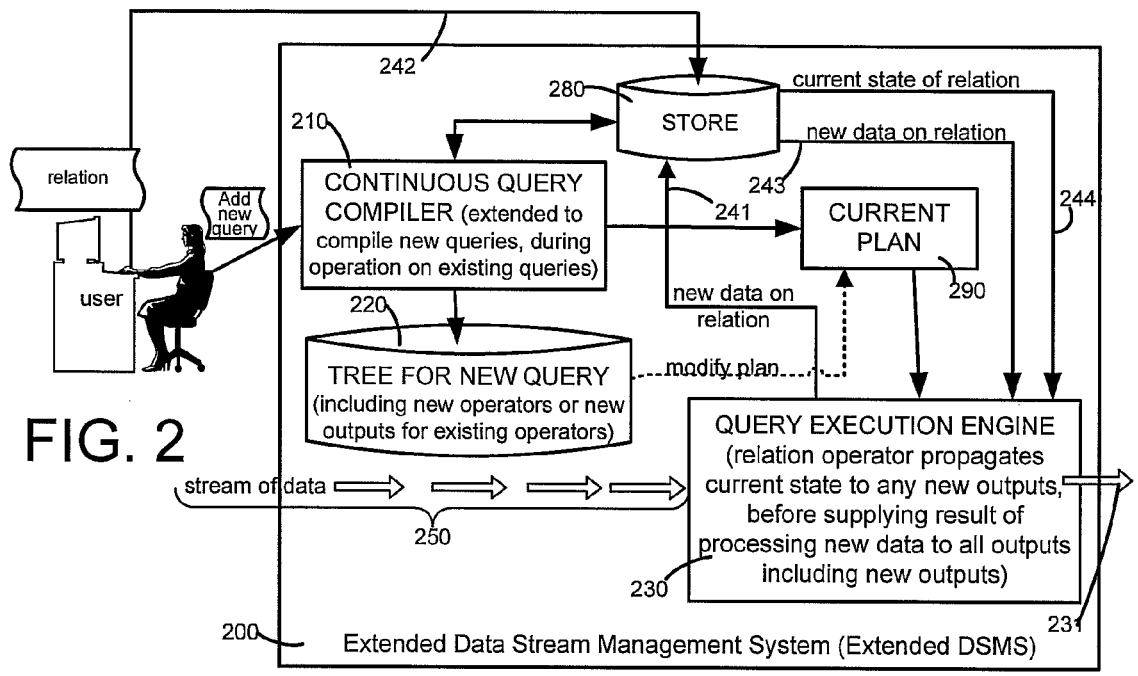
FIG. 2 illustrates, in an intermediate level diagram, a data stream management system (DSMS) that has been extended in accordance with the invention to support adding new continuous queries during operation on existing continuous queries.

In embodiments that use tuples to represent a relation, tuples are typically received in extended DSMS 200 in the form of a data stream, e.g. carried by a communication link 242 from a user as shown in FIG. 2. Depending on the embodiment, the tuples of a relation may represent requests for two types of changes, namely requests to insert information or requests to delete previously inserted information, which may respectively constitute an Istream or Dstream.

The just-described stream representation of a relation in some embodiments, by time stamped tuples, is also referred to herein as an incremental representation. Although the incremental representation of a relation uses streams (i.e. Istream and Dstream), note that the relation's state is relatively static (e.g. relative to data stream 250). Hence, in practice, streams Istream and Dstream for a relation are several orders of magnitude smaller (in the rate of information flowing therein) than streams normally processed by extended DSMS 200. Use of Istream and Dstream to represent such a static relation enables several embodiments to process all information in extended DSMS 200 using a single data type, namely the stream data type. In contrast, as noted above, certain alternative embodiments of the invention store a relation's current state information in a non-incremental representation and hence use both data types.

Figure 3:
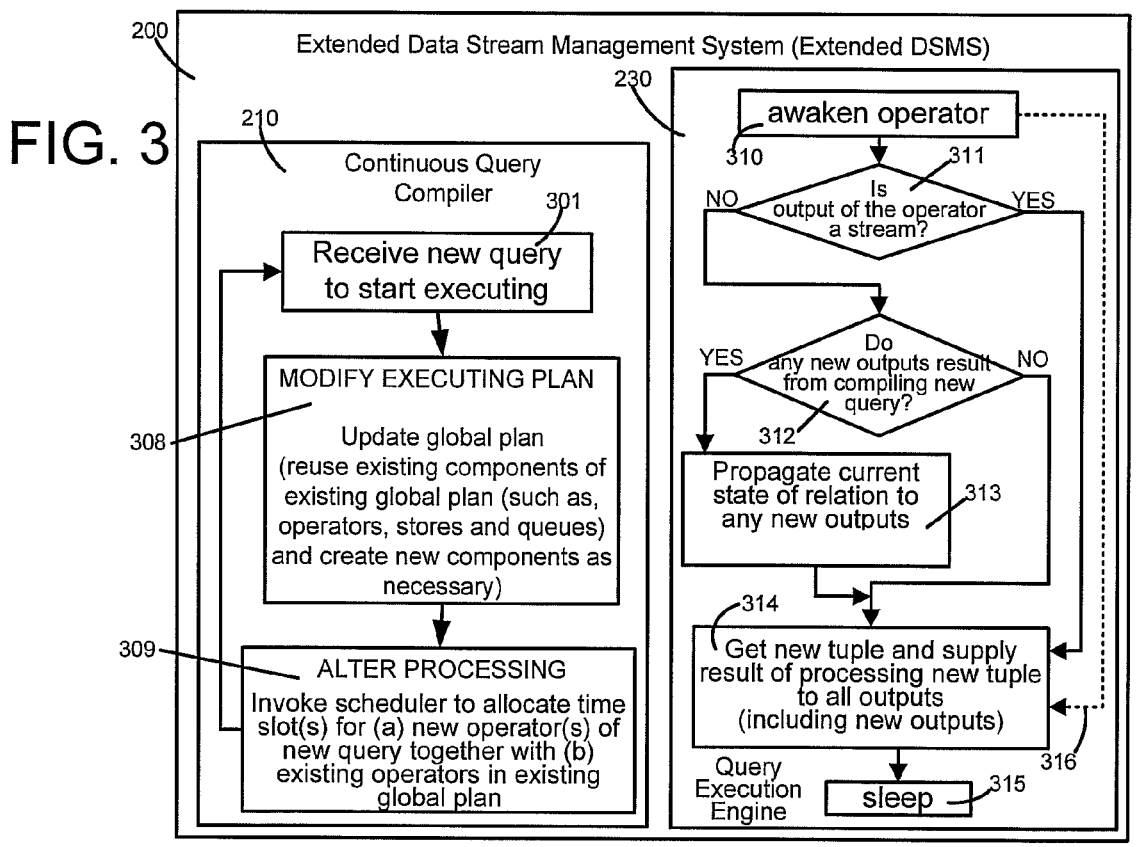
FIG. 3 illustrates, in a flow chart, methods that are executed by the extended DSMS of FIG. 2, in some embodiments of the invention to obtain a modified plan by addition of new continuous queries, and propagation of all tuples of relation operator(s) shared with the new continuous queries during execution of the modified plan.

Embodiments that use an incremental representation of a relation may implement the act of propagating the relation's state by reading the relation's initial state and all subsequent tuples from relational store 280 as illustrated in act 313 of FIG. 3. Some embodiments use a queue to communicate references to tuple references (e.g. pointers to tuples) between a relational operator and any operators coupled thereto (as the queue supports multiple readers). In such embodiments, each of the multiple outputs of the queue initially supplies a current state of a relation R from store 280, for propagation to the respectively coupled readers.

Moreover, each of the multiple outputs of the queue identifies any tuple references in the queue that have not yet been read by its respectively coupled reader. A tuple reference remains in the queue until readers coupled to all outputs of the queue have read the tuple reference, at which time the tuple reference is deleted from the queue. The tuple references are typically arranged in order of receipt relative to one another. A newly added output of the queue may identify to its newly-added reader one or more tuple references that have been already read by other readers coupled to other outputs of the queue. The just-described already-read tuple references may be added to the queue during propagation of current state of a relation, e.g. to initialize the newly added output.

Furthermore, in these embodiments, the current state of the relation is maintained in store 280. Note that it is only applicable to operators whose output is a relation. Also a data structure (e.g. a bit map) is maintained to denote the newly coupled operators. Accordingly, execution of a new continuous query in such embodiments begins with each relation's current state being propagated to the newly coupled operators. In these embodiments, execution of the new continuous query on streams (in contrast to relations) does not use any current state (since there is none) and instead uses new tuples that are time stamped after the current time (at which time execution resumes).

In some embodiments, a multi-reader queue of the type described above enables propagation (by reading) of a relation's state selectively to only certain operators that are being used in a new continuous query which did not previously read this information. Such selectivity avoids propagation of past tuples multiple times, to operators of existing queries. More specifically, the queue of certain embodiments supports marking by each operator of tuples in a relational store as being available to be read only by individually identified outputs of the queue that have been newly added, for execution of the new continuous query.

The above-described queue may be implemented in any manner well known in the art, although certain embodiments of the invention use the following implementation. The queue does not itself contain any tuples and instead it contains references to a store (which may be a relational store or a window store) in which the tuples are stored. Each output (and hence reader) of the queue has a read pointer which is advanced when a tuple for that output is read from the store. The queue initially holds references to all tuples that are received, until a tuple is read by all readers of the queue, at which time that tuple's reference is automatically deleted from the queue. For example, if a $1^{st}$ continuous query is received at time 100 and a $2^{nd}$ continuous query is received at time 300, and if a tuple of a stream used by both queries came in at time 175 and its negative came in at time 275, then the $2^{nd}$ query never sees this tuple, although references to the tuple and its negative are both seen by the $1^{st}$ query. A negative of a tuple typically represents a request to delete information inserted by the tuple, which is an incremental change as discussed in paragraph [0042].

Depending on the embodiment, even when a tuple's reference is deleted from a queue, that particular tuple itself may still exist in the underlying store, for example for use by another queue. The store is implemented in such embodiments with the semantics of a bag of tuples that are written by the queue. These tuples are read by multiple readers of a queue that have been added as subscribers to the store, and each reader may individually dequeue a given tuple's reference, from that reader's view of the queue, after reading the given tuple from the queue. In such embodiments, the queue has only one writer, to write each tuple just once into the store, on receipt of the tuple by extended DSMS 200 from an outside stream (e.g. from a user).

In several embodiments, a store is created for and owned by a physical operator (such as a range window operator on a stream) that is used in a continuous query (hereinafter "$1^{st}$ continuous query"). Hence, store is automatically shared when the same physical operator is also used in a $2^{nd}$ continuous query which is added subsequent to start of execution of the $1^{st}$ continuous query. In some embodiments, only operators that are sources of data for the $2^{nd}$ continuous query (typically, but not necessarily, leaf node operators) are shared. In such embodiments, the only requirement to share operators is that they have an identical name (of a relation or stream) that is being sourced therefrom.

Depending on the embodiment, a physical operator for the $1^{st}$ continuous query may read data from a relation's store or from a store of a window on a stream, using a queue which may be same as or different from the queue used by the same physical operator when executed for the $2^{nd}$ continuous query. A single physical operator that is used in execution of different queries may itself use a single queue to support multiple readers in the different queues of some embodiments, although in other embodiments different queues are used by the same physical operator in different queries.

For example, assume that a store (hereinafter "window store") for a stream operator of an illustrative embodiment holds stream tuples A, B, C and D (also called messages A, B, C and D). If tuple A has been read by the $1^{st}$ continuous query from the window store, then tuple A is dequeued from the $1^{st}$ queue but the same tuple A remains in the window store until a later point in time when tuple A is dequeued by the $2^{nd}$ queue. In this embodiment, tuple A is not deleted from the window store until tuple A has been read by all subscribers that read from the window store, at which time it is automatically deleted.

In the just-described example, after tuple A has been deleted from the window store, if a $3^{rd}$ queue has a new reader that now subscribes to the window store, then the $3^{rd}$ queue may once again insert the same tuple A into the window store, but at this stage the re-inserted tuple A is not available to the $1^{st}$ queue and to the $2^{nd}$ queue (both of which have already read tuple A). This is because messages being inserted for the $3^{rd}$ queue are directed only to its reader (i.e. $3^{rd}$ queue's reader), and not to the readers of the $1^{st}$ queue and the $2^{nd}$ queue.

Propagation to new outputs (see act 313 in FIG. 3) of a relation's current state is performed in some embodiments in a transparent manner, i.e. without any failure that requires a user's attention, whereby soft errors and/or soft exceptions are automatically handled transparent to the user. Examples of soft errors include lack of a resource, such as memory. For example, a transparency feature may be implemented in some embodiments by architecting propagation of a relation's state to be responsive to soft errors (e.g. lack of memory), by automatically suspending the propagation until the soft error is resolved, followed by automatically resuming the propagation after the soft error is resolved. The transparency feature which is used in some embodiments ensures that the user is not notified of a failure to propagate, because user is not involved in starting such propagation.

In some embodiments, only bottom-most operators in an execution tree are shared among queries as described herein, namely operators at level L=0, which directly receive tuples of event data in extended DSMS 200 from outside. Such operators do not have any other inputs, and hence they can be shared between different queries as long as the operators have the same name, e.g. if the operators represent the same relation. Alternative embodiments of the invention check if operators at higher levels can be shared. Specifically some alternative embodiments check if operators at level L>0, e.g. if a Join operator used for executing existing queries can be shared with a new continuous query. Such alternative embodiments may check if a subtree rooted at p can be implemented by a subgraph in the currently executing plan.

During the propagation of entire state of a relation in act 313, all tuples with a current time stamp are propagated, including both insert requests and delete requests, in embodiments that use these form of tuples as described above, in paragraph [0042]. Hence, it will be apparent to the skilled artisan, from this disclosure that the extended DSMS 200 thereafter behaves as if the new continuous queries were always present (relative to the relation). Such behavior enables the extended DSMS 200 to execute the new continuous query in a manner consistent with its execution of one or more existing continuous queries. Hence, if a new continuous query happens to be identical to a existing continuous query, identical streams are thereafter produced, as outputs thereof.

Next, a new tuple of the relation is propagated (as per act 314), to all outputs of the corresponding operator (i.e. to new outputs as well as pre-existing outputs of the relation operator). The new tuple of a relation may be generated in any manner, depending on the embodiment. For example, the new tuple may arise from changes to a relation that are identified by a user, via a communication link 242 into store 280 of extended DSMS 200 (FIG. 2). Alternatively, the new tuple may also be generated within the extended DSMS 200 itself, e.g. by a window operator in query execution engine 230 from a stream, which new tuple is stored via line 241 (FIG. 2) in store 280. Note that act 313 (FIG. 3) is not required in case of execution of a stream operator by query execution engine 230, which transfers control via branch 316 directly to act 314. Act 314, as noted above, propagates the new tuple to all outputs of the operator (in this case, the stream operator).

Depending on the embodiment, the extended DSMS 200 may perform act 313 at any time before act 314, after execution resumes with the modified executing plan. In some embodiments, act 313 is performed at whatever time the relation operator that is being shared (between one or more existing queries and one or more new continuous queries) is scheduled to be executed next. In several embodiments, extended DSMS 200 schedules operators on a round-robin basis, although other scheduling mechanisms may also be used in accordance with the invention, depending on the embodiment.

In certain alternative embodiments, act 313 (FIG. 3) may be performed even before the scheduled awakening of, and execution of the shared relation operator, depending on the architecture (e.g. if a relation operator is architected to propagate only incremental changes to state and does not contain functionality to propagate the entire state of the relation). As noted elsewhere herein, in some embodiments the relation does not have an incremental representation at all and instead a complete value of the relation is propagated every time, in which case propagation by act 313 is not performed.

Note that although a procedure for propagating previously-received information to an operator's newly added outputs has been described above in the context of sourcing tuples of a relation, the same procedure may also be used in some embodiments by an operator that sources tuples of a view relation operator (i.e. an operator that sources the information to implement a view on top of a relation). In this context, a view of extended DSMS 200 has the same semantics as a view in a prior art database management system (DMS).

Figure 4A:
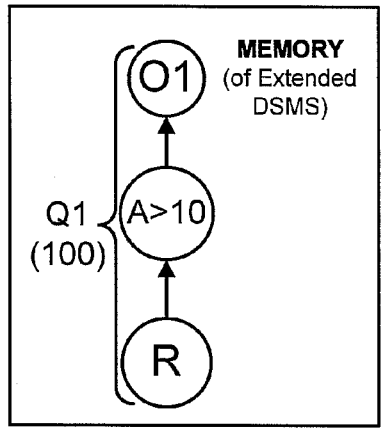
FIGS. 4A-4F illustrate examples of trees of operators at different instants of time during modification of an execution plan to add a new continuous query, in accordance with the invention.

Operation of extended DSMS 200 of some embodiments is further described now, in the context of an illustrative example shown in FIGS. 4A-4E. Specifically, FIG. 4A shows a tree for a query Q1 that is registered for execution in the extended DSMS 200 at time 100, e.g. by the user typing in the following text in a command line interpreter:

Q1: Select * from R where A>10

Assume that relation R represents the number of chairs in a conference room. For example, if there are 25 chairs in a given conference room (identified as ROOM-1), then its identity (ROOM-1) is returned as the result of the query, because this number 25 is more than 10.

Figure 4C:
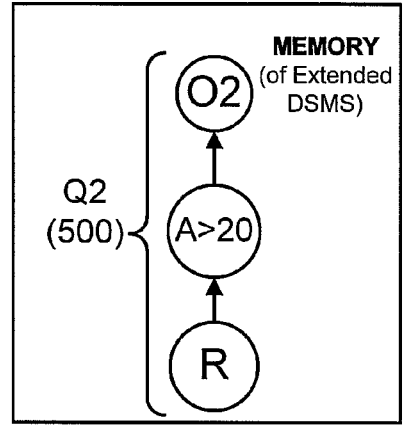
Figure 4B:
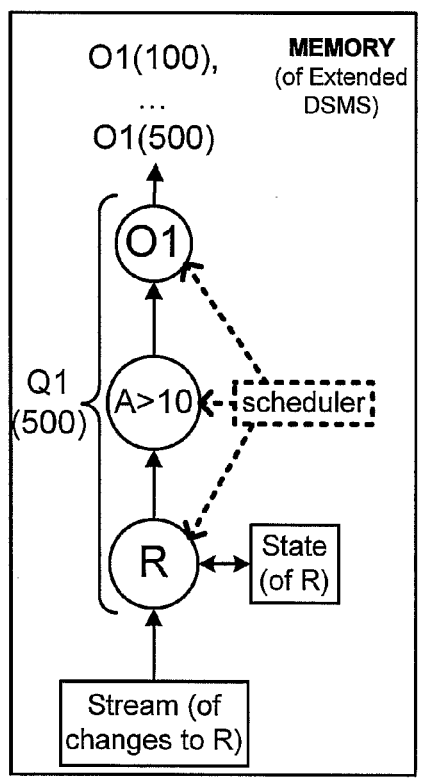

On receiving the above-described continuous query, extended DSMS 200 creates a query object illustrated in FIG. 4B, and stores the root of an optimized physical plan for the query. Note that the root of this plan is not the output operator O1, and instead the root is the operator A>10 (FIG. 4B). Next, extended DSMS 200 starts execution of this plan to generate a stream of output tuples, with the first tuple being O1(100) of value ROOM-1 and at time 500 a current tuple being O1(500) of value ROOM-2 (e.g. if some chairs were moved at this time, from ROOM-1 to ROOM-2). In this example, the identity of the conference room changes, at time 500. More specifically, at time 500, the state of relation R is changed by a delete request for ROOM-1 and an insert request for ROOM-2.

Also at time 500.5, assume a new query Q2 is registered for execution in the extended DSMS 200, e.g. by the user typing in the following text in a command line interpreter:

Q2: Select * from R where A>20

In this example, as seen from FIG. 4C, a tree for query Q2 is almost identical to the corresponding tree for query Q1 shown in FIG. 4A. The only difference between these two queries is the filter, i.e. A>20 is used by Q2 whereas A>10 is used by Q1. Hence, a tree 220 (FIG. 2) for query Q2 is initially generated by the continuous query compiler 210, and a structure of this tree is illustrated in FIG. 4C.

Figure 4D:
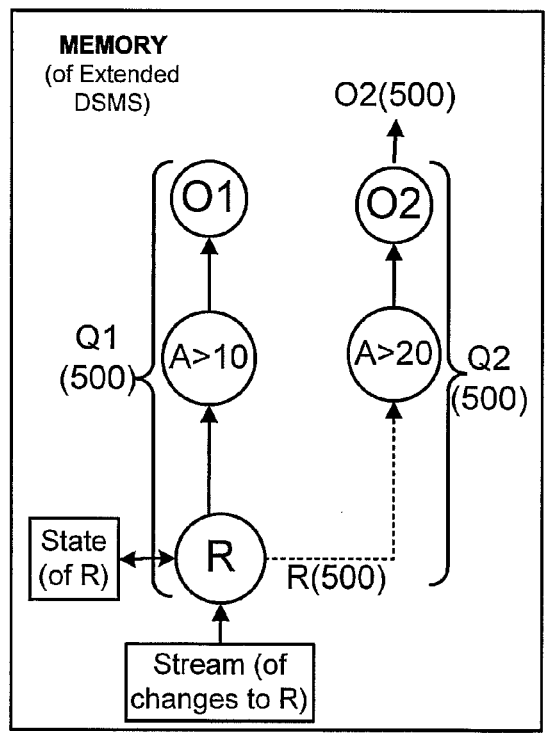

Accordingly, relation operator R can be shared, in a modified plan for execution of both queries Q1 and Q2 as illustrated in FIG. 4D. Hence, as noted above, a continuous query compiler 210 generates the modified plan by modifying existing plan in memory 290 (FIG. 2), and when this is done a query execution engine 230 propagates the current relation state (i.e. all tuples with the current time stamp) to filter A>20, as per act 313 (FIG. 3). As noted above, the state of relation R changed at time 500 (before the new query got registered), and hence the latest value of the relation, which is insert request for ROOM-2 is propagated to the filter A>20. The insert request for ROOM-2 is thereafter supplied in an output O2(501) as per FIG. 4E, because the corresponding value of A, i.e. the number 25 is more than 20. Note that the insert and delete requests were already previously propagated to filter A>10, and for this reason are not again propagated at this time.

Figure 4E:
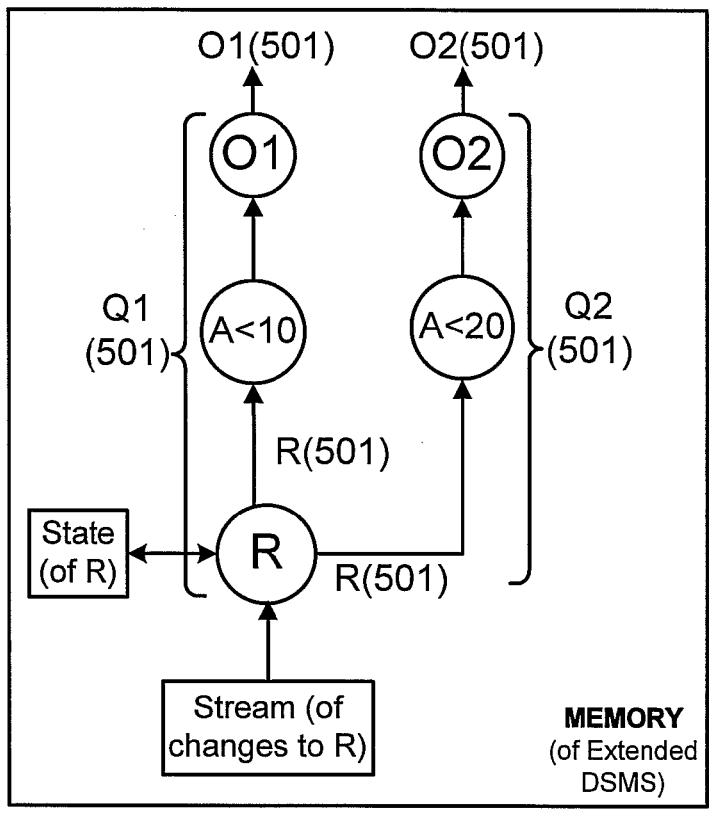
Figure 4F:
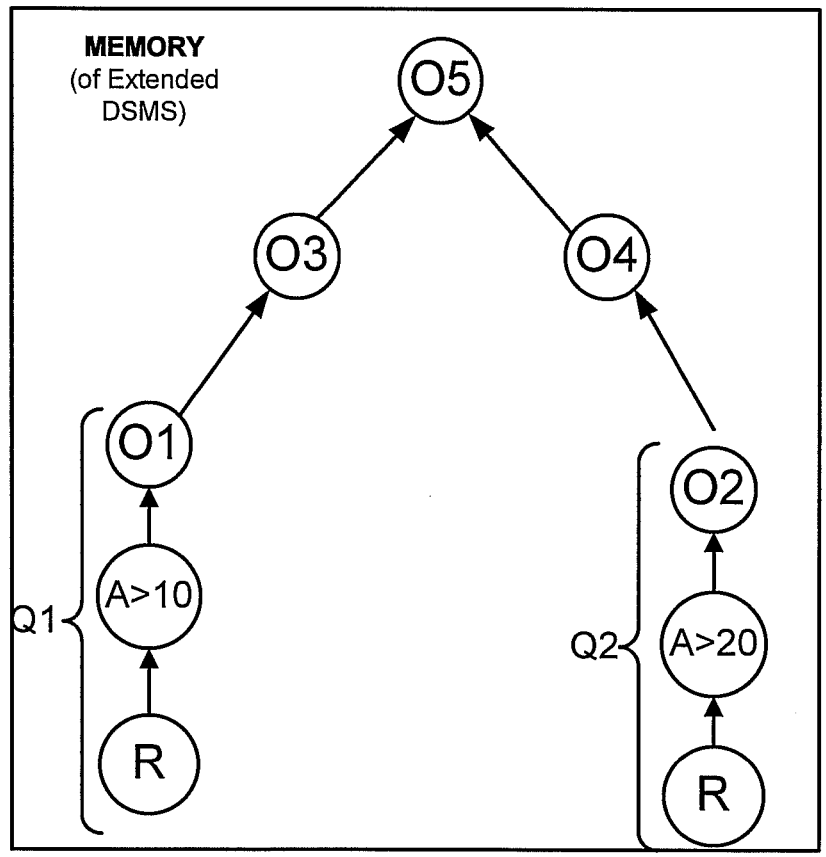

Subsequently, the relation operator R supplies any new tuple at time 501 (see FIG. 4E) to both its outputs and therefore that new tuple is supplied to both filters A>10 and A>20, which in turn generate their corresponding outputs O1(501) and O2(501) for transfer to their respective destinations (not shown in FIG. 4E). After execution of query Q2 has begun, and after outputs O1(501) and O2(501) have been generated as just described (FIG. 4E), in a similar manner at a future time, a new query Q3 may be submitted to extended DSMS 200, by a user. As shown in FIG. 4F, an example of such a query Q3 may filter the outputs of queries Q1 and Q2 using the respective operators O3 and O4, followed by joining of the filtered results via operator O5. Hence, in this example, the output operators O1 and O2 of queries Q1 and Q2 are modified in some embodiments by adding new queues which from the inputs to new operators O3 and O4, which in turn supply their output streams as input streams to another new operator O5.

In some embodiments, a computer of extended DSMS 200 is programmed to perform the three methods illustrated in FIGS. 5A-5C, to sequentially compute each of a logical plan, a physical plan and to modify an executing plan, as discussed next. Specifically, a query is received in act 301 (FIG. 5A), followed by parsing of the query and performance of semantic analysis in act 301A, followed by building of a syntax tree in act 302A, followed by building of a tree of logical operators in act 302B. Note that the just-described acts can be performed in any manner known in the prior art, e.g. as in any prior art DSMS.

Figure 5A:
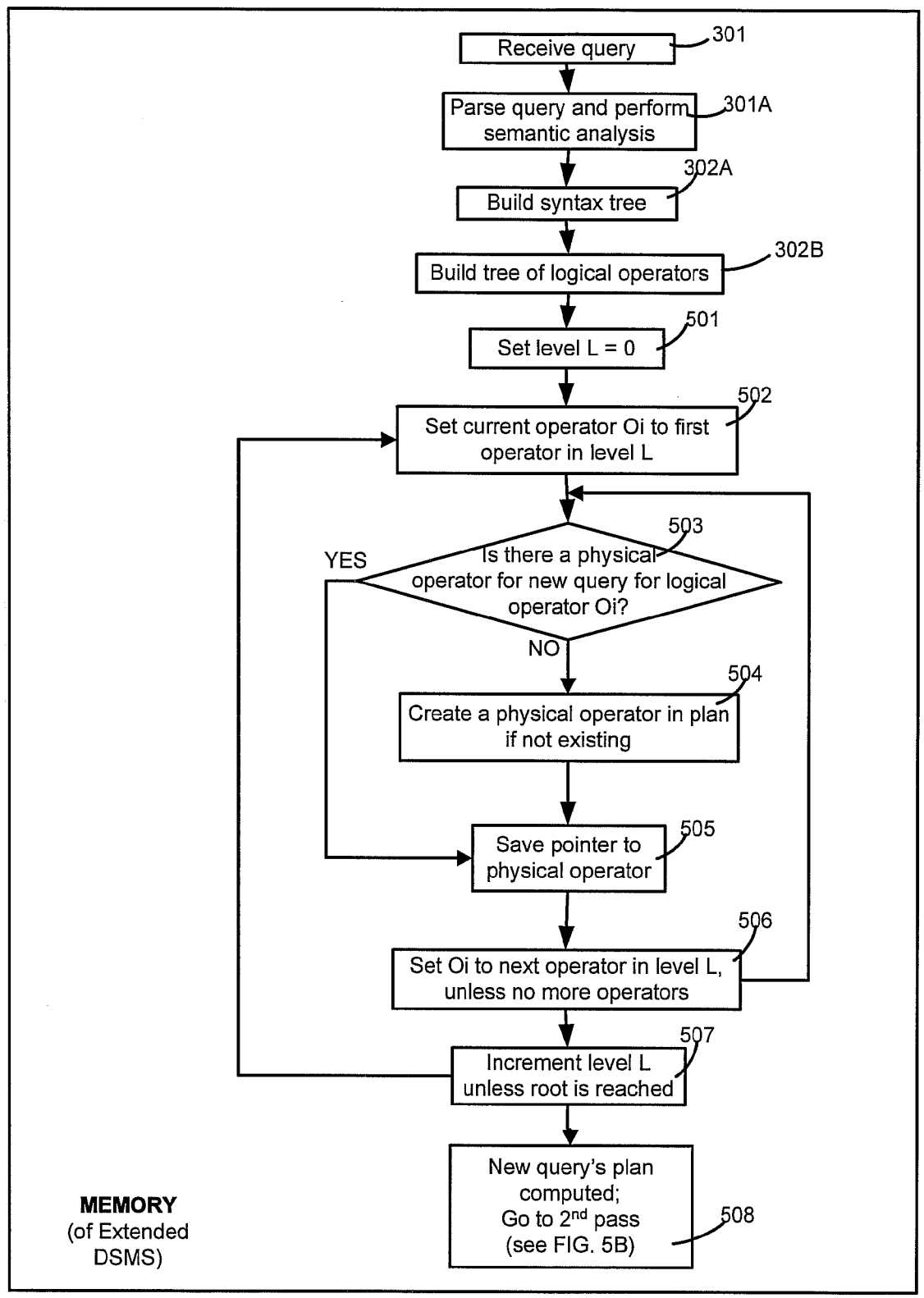
FIGS. 5A-5C together illustrate, in a flow chart, acts of a method that is performed in some embodiments of the invention, to compute a logical plan, a physical plan and modification of a global execution plan, to add a continuous query

FIG. 5A illustrates how a new logical plan for the query is created, a new physical plan is created and merged with the global plan. So, at the end, DSMS of some embodiments contain a global physical plan (for all the queries registered in the server so far) and a logical plan for the query newly registered. Note that the logical plan is not used from now on in such DSMS. FIG. 5B illustrates how the global physical plan is instantiated. Specifically, the whole plan is traversed again, and the newly created physical operators (the ones that have been newly created as a result of compilation of the newly added query in FIG. 5A) are partially instantiated. During instantiation time, the DSMS of certain embodiments determines what kind of stores and queues will be needed for linking the newly created physical operators. Finally, note that FIG. 5C shows how the global plan is traversed again, and the newly created physical operators (the one that have been newly created as a result of compilation of the newly added query in FIG. 5A) are completely instantiated. Using the information obtained during the steps at FIG. 5B, the appropriate execution structures are created. So, the DSMS of several embodiments determines whether to create a new store or not, and if yes, what type of store to create in FIG. 5B, but actually creates the execution store itself in the steps shown in FIG. 5C.

In act 501, the level L is set to zero, after which time the computer enters a loop between act 502 (which initializes a current operator Oi to a source operator at level L) and act 507 (which increments the level unless root is reached in which case control transfers to act 508, indicative that the first pass has been completed). In the just-described loop of FIG. 5A, extended DSMS 200 is programmed in several embodiments to traverse the tree of logical operators (built in act 302B), in a bottom-up manner as discussed next although other embodiments of the invention may traverse such a tree in a different order.

After act 502 (FIG. 5A), the computer checks if there exists a source operator in a global plan that is currently being executed, for the source operator Oi selected in act 502. Note that in this act, the illustrative embodiment checks only on source operators, such as a source of a relation or a source of a stream. If the answer is no, then as per act 504, the computer creates a new physical operator in a global plan (which is global across multiple queries), and thereafter proceeds to act 505. In the illustrative embodiment, if the operator is not a source operator, then also act 504 is performed, i.e. a new physical operator is created if the corresponding logical operator (such as a filter) is not a source (of a stream or relation).

Next, in act 505, the computer saves a pointer to the physical operator that was created in act 504 or alternatively found to exist in act 503. After saving the pointer, the computer goes to act 506 to increment operator Oi to the next operator in current level L and transfer control to act 503, unless there are no more unvisited operators in level L in which case control transfers to act 507 (discussed in the previous paragraph), after which the first pass is completed.

Figure 5B:
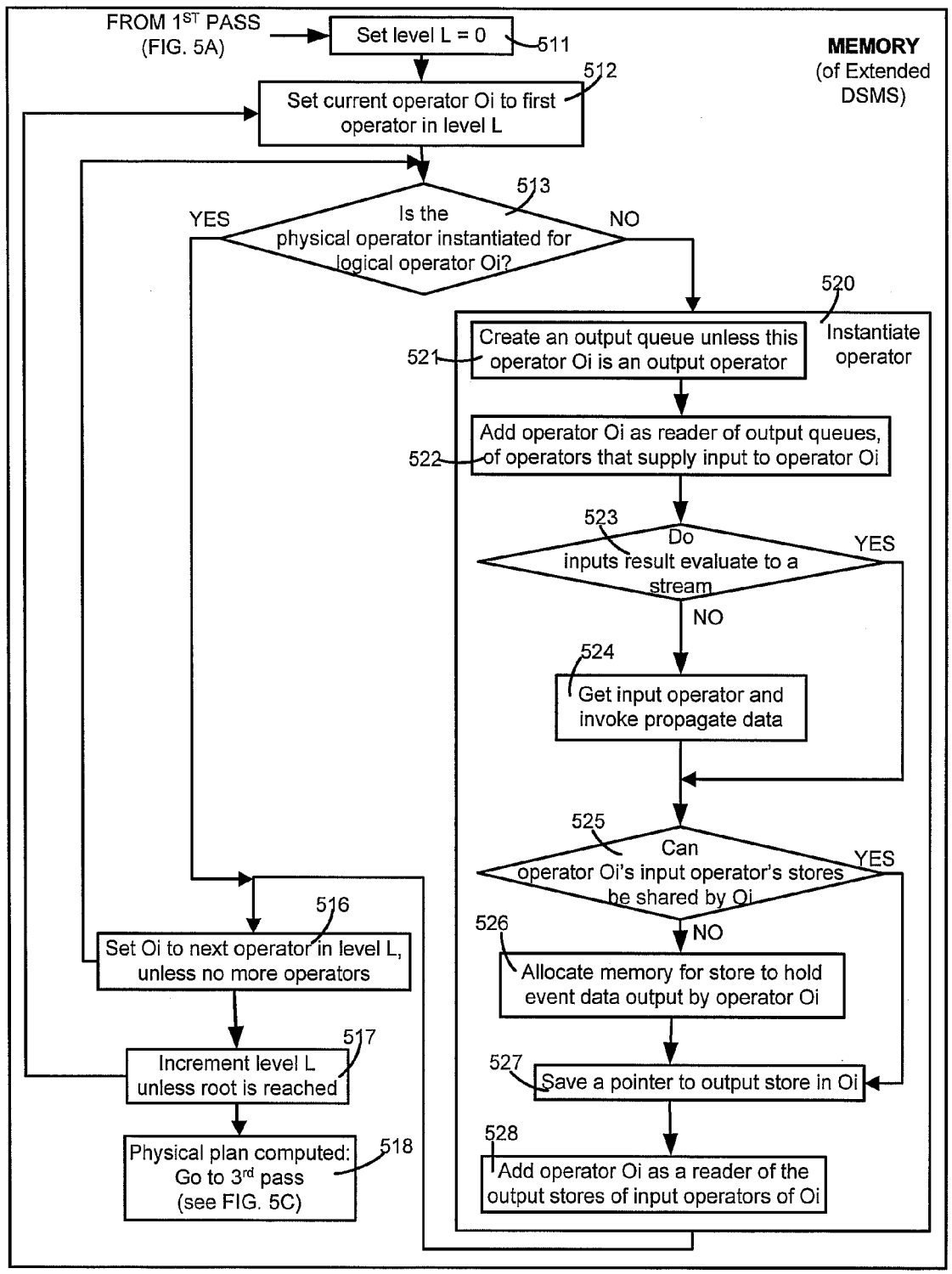

Next, a second pass is begun by the computer as illustrated in FIG. 5B for some embodiments. Specifically, in such embodiments, the computer performs act 511 (FIG. 5B) wherein the level L is set to zero, after which time the computer enters a loop between act 512 of FIG. 5B (which initializes a current operator Oi to a first operator at level L) and act 517 of FIG. 5B (which increments the level unless root is reached in which case control transfers to act 518 (FIG. 5B), indicative that the second pass has been completed, and the physical plan computed).

Referring to FIG. 5B, after act 512 the computer checks (in act 513) if an operator has been instantiated, for the logical operator Oi selected in act 512. If the answer is no, then the computer instantiates the operator as per operation 520 described in the next paragraph below, and thereafter proceeds to act 516 (FIG. 5B). In act 513 if the answer is yes, the computer directly goes to act 516. In act 516, the computer increments operator Oi to the next operator in current level L and transfers control to act 513, unless there are no more unvisited operators in level L in which case control transfers to act 517 (FIG. 5B), after which the second pass is completed. Note that several acts 511, 512, 516 and 517 in FIG. 5B are similar or identical to corresponding acts 501, 502, 506 and 507 in FIG. 5A.

During operation 520 to instantiate an operator, the computer of some embodiments may be programmed to perform a number of acts 521-526 as discussed next, although in other embodiments this operation 520 may be performed by other acts that will be apparent to the skilled artisan in view of this disclosure. Specifically, in act 521, the computer creates an output queue, unless this operator Oi is an output operator. Next, in act 522 the computer adds operator Oi as reader of output queues, of operators that supply input to operator Oi. In act 522, memory is allocated in some embodiments, to hold one or more pointers that are used to implement the reader. Thereafter, in act 523, the computer checks if operator Oi's inputs result evaluates to a stream. If result in act 524 is not a stream, then the computer gets the input operator Oi and invokes a function to take note (by setting a flag, also called propagation-needed flag) of the need to propagate the current state thereof, as per act 524, followed by transfer of control to act 525. If the result in act 523 is a stream, then act 524 is skipped and the computer directly transfers control to act 525. In some embodiments, whenever the execution operator is next invoked by the scheduler, its state is propagated if the just-described propagation-needed flag is set.

In act 525, the computer checks if operator Oi's input operator's store(s) can be shared by Oi. If the store(s) cannot be shared, then the computer allocates memory for a store to hold event data being output by operator Oi (as per act 526), followed by transferring control to act 527. Note that control also transfers to act 527 if an answer in act 525 is yes. In act 527, the computer saves a pointer to output store in Oi, and then adds (as per act 528) operator Oi as a reader of the output stores of the input operators of Oi. In act 528, additional memory is allocated in some embodiments, to hold one or more pointers that are used to implement the reader. This completes operation 520. Thereafter, in act 517 of FIG. 5B, level L is incremented and control transfers to act 513, unless the root is reached in which case control transfers to act 518. On reaching act 518, the second pass is completed, and the physical plan for the new query has been computed.

Figure 5C:
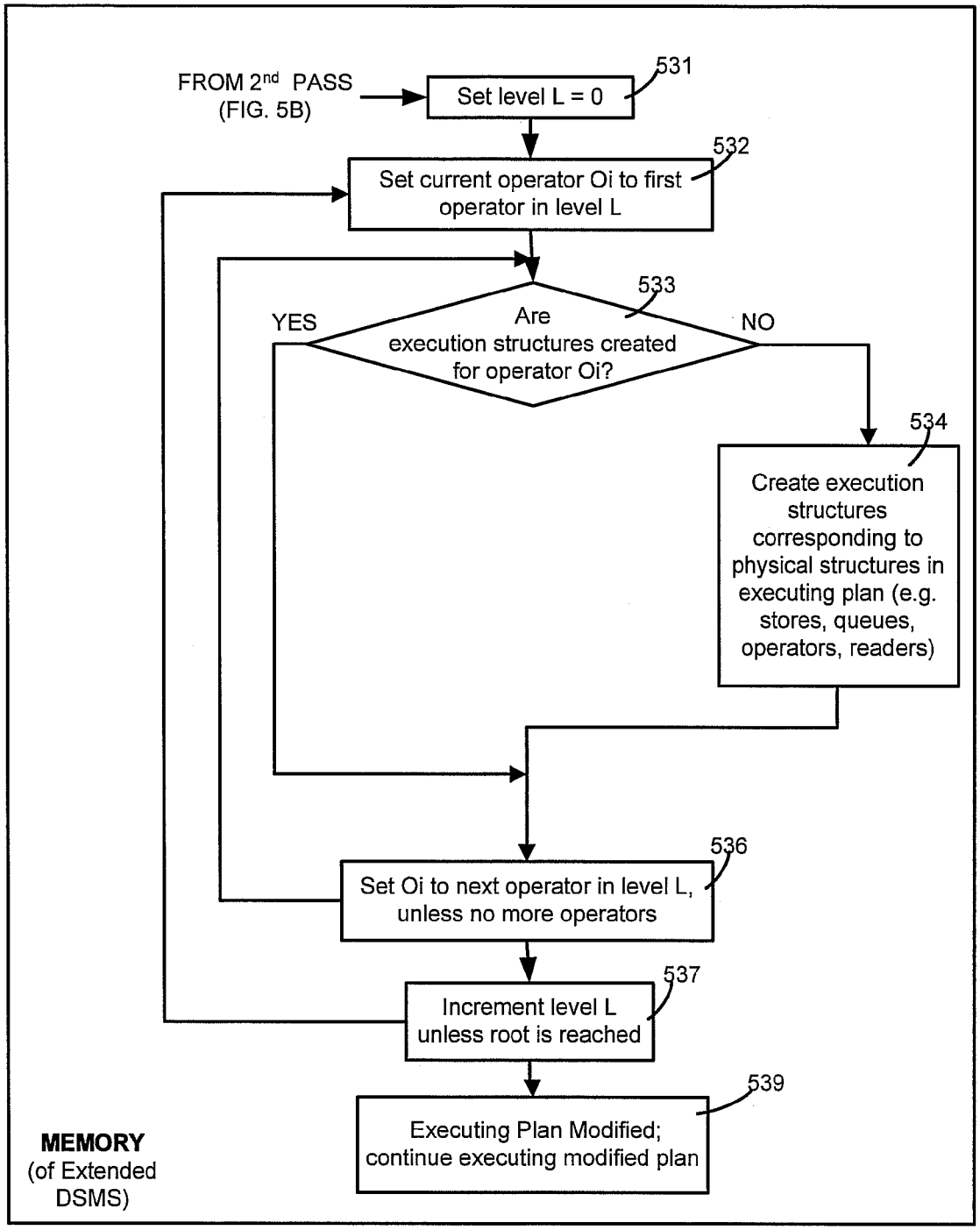

Next, a third pass is begun by the computer as illustrated in FIG. 5C for some embodiments. Specifically, in such embodiments, in act 531 the computer again sets level L to zero, after which time the computer again enters a loop between act 532 of FIG. 5C (which initializes a current operator Oi to a first operator at level L) and act 537 of FIG. 5C (which increments the level unless root is reached in which case control transfers to act 539 (FIG. 5C), indicative that the third pass has been completed, and the executing plan has been modified).

After act 532 (FIG. 5C), the computer checks (in act 533) if execution structures have been created, for the operator Oi selected in act 532. If the answer is no, then the computer creates the execution structures corresponding to physical structures identified in the physical plan, and goes to act 536 (FIG. 5C). Note that in act 531 if the answer is yes, the computer directly goes to act 536 (FIG. 5C). Examples of execution structures that may be created in act 532 include, for example, stores, queues, operators and readers.

In act 536 of FIG. 5C, the computer again increments operator Oi to the next operator in current level L and transfers control to act 531, unless there are no more unvisited operators in level L in which case control transfers to act 537 (FIG. 5C) as discussed above. Note that several acts 531, 532, 536 and 537 in FIG. 5C are similar or identical to corresponding acts in FIGS. 5A and 5B.

In act 533 (FIG. 5C), the computer continues executing queries, this time in the modified executing plan rather than the unmodified executing plan being used when the new query was received. Act 533 begins execution of the newly-added query, and also begins execution of any queries that are referenced therein, such as a view which was never used before. Such a view in turn may reference another query, whose execution is therefore also started, in order to support execution of the newly-added query.

Note that the extended data stream management system 200 may be implemented in some embodiments by use of a computer (e.g. an IBM PC) or workstation (e.g. Sun Ultra 20) that is programmed with an application server, of the type available from Oracle Corporation of Redwood Shores, Calif. Such a computer can be implemented by use of hardware that forms a computer system 600 as illustrated in FIG. 6. Specifically, computer system 600 includes a bus 602 (FIG. 6) or other communication mechanism for communicating information, and a processor 604 coupled with bus 602 for processing information.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying to a computer user, any information related to DSMS 200 such as a data stream 231 that is being output by computer system 600. An example of data stream 231 is a continuous display of stock quotes, e.g. in a horizontal stripe at the bottom of display 612. An input device 614, including alpha-numeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

As described elsewhere herein, incrementing of multi-session counters, shared compilation for multiple sessions, and execution of compiled code from shared memory are performed by computer system 600 in response to processor 604 executing instructions programmed to perform the above-described acts and contained in main memory 606. Such instructions may be read into main memory 606 from another computer-readable medium, such as storage device 610. Execution of instructions contained in main memory 606 causes processor 604 to perform the process steps described herein. In alternative embodiments, hard-wired circuitry may be used in place of or in combination with software instructions to implement an embodiment of the type illustrated in FIGS. 5A-5C. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying the above-described instructions to processor 604 to implement an embodiment of the type illustrated in FIGS. 5A-5C. For example, such instructions may initially be carried on a magnetic disk of a remote computer. The remote computer can load such instructions into its dynamic memory and send the instructions over a telephone line using a modem. A modem local to computer system 600 can receive such instructions on the telephone line and use an infra-red transmitter to convert the received instructions to an infra-red signal. An infra-red detector can receive the instructions carried in the infra-red signal and appropriate circuitry can place the instructions on bus 602. Bus 602 carries the instructions to main memory 606, in which processor 604 executes the instructions contained therein. The instructions held in main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622.

Local network 622 may interconnect multiple computers (as described above). For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network 628 now commonly referred to as the "Internet". Local network 622 and network 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 530 might transmit a code bundle through Internet 628, ISP 626, local network 622 and communication interface 618. In accordance with the invention, one such downloaded set of instructions implements an embodiment of the type illustrated in FIGS. 5A-5C. The received set of instructions may be executed by processor 604 as received, and/or stored in storage device 610, or other non-volatile storage for later execution. In this manner, computer system 600 may obtain the instructions in the form of a carrier wave.

Other than changes of the type described above, the data stream management system (DSMS) of several embodiments of the current invention operates in a manner similar or identical to Stanford University's DSMS. Hence, the relation operator in such a computer propagates any new tuples that have a new time stamp to all query operators coupled thereto, including the newly coupled query operator. In this manner, a computer that is programmed in accordance with the invention to receive and execute new continuous queries while continuing to operate on existing continuous queries, without prior art issues that otherwise arise from updating relation operators during modification of an executing plan.

In some embodiments, the DSMS uses a logical plan for each query, in addition to a global physical plan and a global execution plan for all the queries registered in the system. In these embodiments, in the global physical plan, the operators are linked with each other directly, whereas in the global execution plan, they are completely independent of each other, and are indirectly linked with each other via queues. Moreover, in several such embodiments, a global physical plan contains physical operators, whereas a global execution plan contain execution operators. As noted above also, the physical operators of certain embodiments are directly linked with each other, whereas the execution operators are not. Physical operators of many embodiments contain the compile-time information, whereas the execution operators contain the run-time information and are scheduled by the scheduler. The compiler of certain embodiments uses the physical plan for all the optimizations (merging, sharing, the type of store to be used etc.) and then the corresponding execution operators are created.

Numerous modifications and adaptations of the embodiments described herein will be apparent to the skilled artisan in view of this current disclosure. Accordingly numerous such modifications and adaptations are encompassed by the attached claims.

Following Subsections A and B are integral portions of the current patent application and are incorporated by reference herein in their entirety. Subsection A describes one illustrative embodiment in accordance with the invention. Subsection B describes pseudo-code that is implemented by the embodiment illustrated in Subsection A.

Subsection A (of Detailed Description)

A method performed in some embodiments is illustrated in the following pseudo-code.

1. Registering a Query Q with the System
   a. This is done as per act 301 in FIG. 5A. An object for the query is created in metadata. In some embodiments, a command interpreter receives the user's text for the query.
   b. At this point, the query text is parsed, semantic analysis is done (and if there are no user errors in the query specification) the logical plan is computed, the physical plan is computed and the physical plan is also optimized. This is done as illustrated by acts 301A-518 (spanning FIGS. 5A and 5B)
   c. After completion of semantic analysis, the list of from clause entities are visited to determine if this query has any direct dependencies on views. For each of the views that this query directly depends on, the query associated with the view is obtained and is stored in the Query object as the set of query dependencies; This is done as part of act 301A in FIG. 5A.
   d. A Query object is created and it stores the root of the optimized physical plan for the query. Note that the root of this plan is not the Output operator.
   e. As part of the physical plan computation, sharing of the common (with other queries) base tables and views is also achieved. View sharing involves "pointing" to the view root operator that is "above" the root operator for the query associated with the view. For base table and view, sources that are referenced for the first time by this query (i.e. no other registered query in the system references these base tables/views), a Stream Source operator and a View Root operator are created and stored in a global array of source operators maintained in the DSMS. This is illustrated in act 504.

2. Destinations for the Query Q are Specified.
   a. A physical layer Output operator is created. This results in the creation of the Output operator and its association with the Input/Output driver corresponding to the specified destination. The instance of the Output operator created is returned. See act 504
   b. The returned Output operator is added to a list of outputs for the query and stored inside the Query object. See act 505
   c. At this point, the query Q is checked if it has already been started
   d. If no (as in this case), then nothing else needs to be done 3. The Query Q is Started for Execution
   a. If the query has already been started, then do nothing and return
   b. Else, recursively, execution operators are created recursively for the operators—see FIG. 5C.
   c. The state of the query is set to STARTED, so that it doesn't get started again. Note that this state is checked in 2 (c) above.

Subsection B (of Detailed Description)

A method performed in some embodiments is illustrated in the following pseudo-code.

In one implementation, the internal representation of a relation is an incremental representation. When a new query Q is being admitted into an already running system (dynamic query addition), the following scenario may be encountered. There could be a newly created execution operator p (newly created and private to the current query Q) one of whose inputs is an operator c that is being shared and is already part of the running system when query Q is being admitted into the system.

If operator c evaluates to a relation, then the operator c first propagates its current relation state to the newly created operator p (which is coupled to an output of c) (via the queue connecting operators c and p), before sending any further data on the relation. This is because an incremental representation is used for relations and this implies that a starting snapshot (i.e. an initial state) is required on top of which subsequent incremental data have to be applied, to determine the state of a relation at any point in time (the state of the relation input from c, for the operator p).

Thus, to support dynamic query addition, several embodiments identify existing operators that need to propagate their relation's state, and also identify the newly created operators to which they should be propagating that state. Some embodiments identify existing operators that need to propagate their relation's current state, and also identify for each such existing operator the queue reader identities ("ids") corresponding to the newly created operators to which state is to be propagated.

Following describes a general approach used in various embodiments on top of any operator sharing algorithm (OSA for short) which has the following property called "OSA Subgraph Property": If OSA determines that an operator corresponding to p can be shared from the existing global execution plan, then OSA determines that the subtree rooted at p can be implemented by a subgraph of the existing global execution plan.

Introduction
1. Q denotes the current query being started
2. GQ denotes the global execution plan that also implements the query Q. GQ forms a directed acyclic graph.
3. Plan GQ is constructed with sharing being determined using an operator sharing algorithm OSA that satisfies the OSA Subgraph property.
4. For each operator p in GQ there is an array of query ids called qidarray. For each qid in this array, operator p participates in the implementation of the query identified by qid.
5. The above-described array is created and maintained as part of creation of GQ by extending OSA.
6. The approach described below is done during the instantiation phase for the query Q The Method
1. Perform the current instantiation traversal. This is a bottom-up traversal such that when visiting node 'n', all of its inputs have already been visited. See operation 520 illustrated in FIG. 5B.
    1.1. A current node in the traversal is denoted by n (a physical operator).
    1.2. If n is a node private to query Q (i.e. the qidarray in n, has only one entry—the qid for the query Q) then
        1.2.1. Let inps be the array of inputs for the node n
        1.2.2. for i=0; i<inps.length; i++
            1.2.2.1. if inps[i] is shared in GQ (qidarray.length>1) and inps[i] is a relation then
                1.2.2.1.1. Let the queue reader id corresponding to the source destination pair (inps[i], n) be rid See act 522 in FIG. 5B.
                1.2.2.1.2. Get an execution operator corresponding to inps[i] and invoke inps[i].instOp.propagateOldData(rid). See act 524 in FIG. 5B.
            1.2.2.2. if inps[i] is private to Q or inps[i] evaluates to a stream, then do nothing; See act 523 in FIG. 5B.
    1.3. If n is a shared node in GQ, then do nothing; see act 512 in FIG. 5B.
2. At the end of this traversal, the requirement would have been addressed NOTE—in the above pseudo-code, a function propagateOldData is called which is implemented as follows in some embodiments:
    Get the list of newly created queue readers '1'
    Initialize the synopsis for the current state.
    While (next tuple is present in the synopsis)
        Get next tuple 't'
        Enqueue 't' to '1'
    End

What is claimed is:

1. A computer-implemented method of managing a plurality of streams of data in a computer, the method comprising:
    processing the plurality of streams, to execute thereon a plurality of continuous queries based on an existing global plan;
    during said processing, receiving a new continuous query to be executed;
    during said processing, identifying from the existing global plan, a first operator that supplies data on a relation;
    during said processing, modifying the existing global plan by coupling the first operator to a second operator to be used to implement the new continuous query, thereby to obtain a modified global plan;
    prior to execution of the new continuous query, a processor in the computer selectively transmitting from the first operator to the second operator but not to a third operator in the existing global plan, a current value of the relation;
    prior to receipt of the new continuous query, said current value being transmitted to the third operator from the first operator by use of at least one reference and said at least one reference being deleted after said current value being read by the third operator during said processing based on the existing global plan;
    altering said processing, to cause execution of the new continuous query in addition to said plurality of continuous queries, based on the modified global plan; and
    outputting from said computer, a stream generated based at least partially on processing of said data by execution of the new continuous query.

2. The method of claim 1 wherein:
    said transmitting from the first operator to the second operator is performed at a time when the first operator is awakened subsequent to creation of the modified plan.

3. The method of claim 1 wherein:
    each said transmitting is performed in an idempotent manner relative to at least one predetermined soft error.

4. The method of claim 1 further comprising:
    initializing at least one parameter of a queue during said modifying; and
    changing at least said parameter of said queue during each said transmitting;
    wherein said queue supports multiple readers and is coupled between the first operator and each operator in a group of operators in the global plan.

5. The method of claim 1 wherein:
    the relation is represented incrementally in the global plan, as a plurality of tuples with each tuple being time stamped; and said data comprises an initial state and all tuples of the relation having a time stamp older than a current time.

6. The method of claim 1 wherein:
the current state is defined by a sliding window identifying from a stream in the plurality of streams, multiple tuples occurring at a current time instant, in a finite portion of said stream.

7. The method of claim 6 wherein:
the sliding window is a tuple-based window that identifies a fixed number of tuples as specified in said new continuous query.

8. The method of claim 1 wherein:
the relation is represented in a memory coupled to said processor, as an image of the current state, and the image is changed dynamically as the relation changes over time.

9. The method of claim 1 wherein:
after said reference is deleted, said current value still exists in a store; and
said current value is retrieved from said store in response to said transmitting from the first operator to the second operator.

10. The method of claim 1 wherein:
the first operator is a relation operator;
the third operator is an existing operator in the existing global plan;
the second operator is a new operator created during modification of the existing global plan.

11. A non-transitory computer-readable storage medium encoded with instructions for a computer to process streams of data using a plurality of continuous queries in a data stream management system, the instructions comprising:
instructions to execute a global plan for execution of the plurality of continuous queries;
instructions to receive a new continuous query to be executed;
instructions to check if new continuous query comprises a relation already referenced in a continuous query among the plurality of continuous queries being executed as per the global plan;
instructions to instantiate a first operator corresponding to said relation if a result of said checking is false;
instructions to mark, as being available for implementation of said new continuous query, a second operator currently present in the computer and corresponding to said relation, if the result of said checking is true;
instructions to instantiate a third operator corresponding to said new continuous query;
instructions to couple to the third operator, an appropriate operator selected to be one of the first operator and the second operator, wherein selection of the appropriate operator is based on the result of executing said instructions to check;
instructions to transmit to at least the third operator, a current state of the relation, in response to start of execution thereof;
wherein prior to receipt of the new continuous query, said current state comprising data is transmitted from the first operator by use of at least one reference and said at least one reference being deleted after said data in said current state being read by the second operator;
instructions to supply to all operators coupled to the appropriate operator, information related to a new state of the relation, wherein said all operators comprise at least said second operator and said third operator; and
instructions to output from said computer, a stream generated based at least partially on processing of said data by execution of each of said operators.

12. The computer-readable storage medium of claim 11 wherein:
said all operators comprise at least a fourth operator already present in the global plan.

13. The computer-readable storage medium of claim 11 wherein:
said instructions to transmit the current state are to be executed at a time when the appropriate operator is next awakened.

14. The computer-readable storage medium of claim 11 wherein:
said instructions to transmit the current state are executed in an idempotent manner relative to at least one predetermined soft exception.

15. The computer-readable storage medium of claim 11 further comprising:
instructions to initialize at least one parameter of a queue; and
instructions to change at least said parameter of said queue;
wherein said queue supports multiple readers and is coupled between the appropriate operator, the third operator, and a fourth operator already present in the global plan.

16. The computer-readable storage medium of claim 11 wherein:
the current state is defined by a sliding window identifying from a stream in the plurality of streams, multiple tuples occurring at a current time instant, in a finite portion of said stream as specified in said new continuous query.

17. The computer-readable storage medium of claim 16 wherein:
the sliding window is a tuple-based window that identifies a fixed number of tuples.

18. A data stream management system that processes streams of data using a plurality of continuous queries, the data stream management system comprising:
a store encoded with a plurality of tuples representing a relation, each tuple being time stamped;
a memory encoded with a query plan currently being used in execution of the continuous queries;
means, coupled to said store, for modifying the global plan in said memory in response receipt of a new continuous query that uses said relation, if the global plan comprises a first operator that supplies at least one tuple of the relation, by using a multi-reader queue to couple the first operator to a second operator to be used to implement the new continuous query; and
means, coupled to said means for modifying and to said store, for transmitting a current state of the relation, from the first operator to the second operator but not to a third operator, before transmission of a new tuple having a new time stamp;
wherein prior to receipt of the new continuous query, said current state comprising data is transmitted from the first operator by use of at least one reference and said at least one reference being deleted after said data in said current state being read by the third operator.

19. The data stream management system of claim 18 wherein:
said means for transmitting the state is operated at a time when the first operator is awakened subsequent to creation of the modified plan.

20. The data stream management system of claim 18 further comprising:

means for initializing at least one parameter of a queue comprised in said means for modifying; and means, coupled to said means for transmitting, for changing at least said parameter of said queue;

wherein said queue supports multiple readers and is coupled between the first operator and each operator in a group of operators in the global plan.

21. The data stream management system of claim 18 wherein:

the relation is represented incrementally in the global plan, as a plurality of tuples with each tuple being time stamped; and an initial state and all tuples of the relation having a time stamp older than a current time represent said current state.

* * * * *